(12) United States Patent
Fujisawa

(10) Patent No.: US 8,082,557 B2
(45) Date of Patent: Dec. 20, 2011

(54) DISK DEVICE

(75) Inventor: Shinichi Fujisawa, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 10 days.

(21) Appl. No.: 12/849,580

(22) Filed: Aug. 3, 2010

(65) Prior Publication Data
US 2011/0029993 A1 Feb. 3, 2011

(30) Foreign Application Priority Data

Aug. 3, 2009 (JP) ................................ 2009-180755
Aug. 3, 2009 (JP) ................................ 2009-180756

(51) Int. Cl.
*G11B 17/04* (2006.01)
(52) U.S. Cl. ........................................................ 720/620
(58) Field of Classification Search .................. 720/706, 720/622, 623, 713, 704, 619, 715, 655, 610, 720/624, 707, 702, 712, 723, 620, 604, 626, 720/714, 613, 621, 628
See application file for complete search history.

(56) References Cited

U.S. PATENT DOCUMENTS

| | | | |
|---|---|---|---|
| 6,347,070 B1 * | 2/2002 | Fahey et al. ................ | 720/706 |
| 6,535,476 B1 * | 3/2003 | Haga .......................... | 720/706 |
| 7,517,078 B2 * | 4/2009 | Kan et al. .................... | 347/104 |
| 2005/0264634 A1 * | 12/2005 | Kan et al. .................... | 347/104 |
| 2007/0192781 A1 | 8/2007 | Ahn et al. | |

FOREIGN PATENT DOCUMENTS

| | | |
|---|---|---|
| JP | 2007220276 A | 8/2007 |
| JP | 2008198264 A | 8/2008 |
| JP | 2009037710 A | 2/2009 |

* cited by examiner

*Primary Examiner* — Allen Cao
(74) *Attorney, Agent, or Firm* — Seed IP Law Group PLLC

(57) ABSTRACT

To eject an optical disk forcibly from a disk device by a manual operation, an operation pin is inserted into an emergency hole of a front bezel. Then, the operation pin causes first and second ejection levers to move rearward to push a first transmission gear down to a disengaged position. When the first transmission gear is pushed down to the disengaged position, a loading slider begins to move forward according to a biasing force of a coil spring, feeding the disk outward. After moving a distance forward, the loading slider is stopped against a receiving portion of a first ejection lever, thereby to stop the disk at a half-eject position where the disk slightly protrudes from the bezel. Thereafter, when the operation pin is pulled out, the loading slider moves forward along with the pull-out movement of the operation pin, and the disk is fed out to a full-eject position.

14 Claims, 25 Drawing Sheets

DISK DEVICE

FIELD OF THE INVENTION

The present invention relates to a disk device that permits ejecting a disk forcibly through a manual operation in case of emergency.

BACKGROUND OF THE INVENTION

Various information technology devices such as computers and car navigation equipments use disks (e.g. CD, DVD, and Blue Ray Disk) as recording media, which can store information of a considerable amount. The disk is loaded in a disk device to write information onto or read information from the disk. In general, disk devices, which are incorporated in the information technology devices, include two types: a tray type can hold the disk on a tray that can be protruded from or retracted into the equipment, and a slot-in type allows inserting or ejecting the disk directly through a slot. The slot-in type disk device includes a disk feeding mechanism having a motor-driven loading slider. Insertion of the disk into a slot of a front bezel causes a slight movement of the disk feeding mechanism, which actuates a motor. The actuated motor causes the loading slider to move in a direction to feed the disk into the slot. Thus, the disk is loaded in the disk device through the disk feeding mechanism.

The slot-in type disk devices can be smaller and lighter because it does not require the tray. Therefore, the slot-in type is widely used in handheld devices like notebook computers. In order to unload the disk from the slot-in type disk device, an instruction to eject the disk is entered, for example, by pushing a button. In response to this instruction, the motor starts running reversely to unload the disk automatically.

However, if the power shuts down accidentally because of power outage or the like, or if something goes wrong with the disk device, the disk device will not be able to eject the disk automatically, so the disk will be left unloaded. To deal with such an emergency, the disk device is equipped with a forcible disk ejection mechanism.

Disk devices as disclosed in JP-A 2009-03771, JP-A 2008-198264, and US 2007/0192781A1 (corresponding to JP-A 2007-220276), are provided with a disk transport mechanism with a loading slider, a motor for driving the loading slider, and a transmission gear mechanism having a plurality of gears to transmit the rotation of the motor to the loading slider. The prior art disk devices further include a forcible disk ejection mechanism, which is constituted of a rotary disc that holds one of the gears of the transmission gear mechanism such that the rotary disc can cause the one gear to rotate to a position disengaged from other gears. In these prior art disk devices, the loading slider moves forward, i.e. toward the front of the disk device, to feed the disk into a case chassis, and the loading slider moves rearward to feed the disk out of the case chassis. In an emergency that the disk cannot be unloaded automatically, an operation pin is put into a front hole of the case chassis, which causes the rotary disc and hence the gear held by the rotary disc to rotate to a position disengaged from other gears. When the operation pin is pushed further into the hole while the gear is in the disengaged position, the operation pin will push the loading slider rearward, thereby unloading the disk from the case chassis.

In the above mentioned prior arts, the disk is forced out to an ejected position by pushing the operation pin into the deepest position inside the hole. Accordingly, the operator nipping the operation pin by hand has to keep pushing the operation pin into the hole till the disk starts being fed out. In that case, the disk forced out to the ejected position can crash against the operator's finger to cause injury. Therefore, the prior art disk devices are not safe enough for the operator to perform the forcible disk ejection.

SUMMARY OF THE INVENTION

An object of the present invention is to provide a disk device that is improved in safety eliminating the danger of crash of a disk against the operator's finger or the like when the disk is forcibly ejected by a manual operation for emergency.

In order to achieve the above and other objects, a disk device according to the present invention comprises a disk feeding mechanism, a first spring, a motor, a transmission gear mechanism, an ejection device, a second spring and a clutch. The disk feeding mechanism causes a loading slider to move rearward when the motor runs in a forward direction, thereby feeding a disk into a case chassis after the disk is party inserted through a slot of the case chassis. When the motor runs in a reverse direction, the disk feeding mechanism causes the loading slider to move forward, feeding the disk out of the case chassis. The first spring gives a driving force to the loading slider to drive it to move forward. The transmission gear mechanism includes at least first and second gears, and transmits the rotation of the motor to the loading slider to move the loading slider forward or rearward. When pushed by an operation member that is inserted into the case chassis from the front, the ejection device moves rearward against the second spring. While the ejection device is moving rearward, the clutch causes the first gear to move from a position engaged with the second gear to a position disengaged from the second gear. The clutch also causes the first gear to move back to the engaged position while the ejection device is returning to a front position. In the disengaged position where the first gear is disengaged from the second gear, the transmission gear mechanism is separated into a disk feeding mechanism side and a motor side. Along with the operation member being pulled out, the ejection device and the loading slider move forward to feed the disk out of the case chassis.

The ejection device preferably includes a stop member. The stop member receives the loading slider when the loading slider moves to a front position according to the force of the first spring after the first gear moves to the disengaged position. The stop member also permits the loading slider to move forward along with the ejection device till the first gear returns to the engaged position while the ejection device is returning to the front position.

The ejection device preferably includes a first ejection lever and a second ejection lever. The first ejection lever is pushed by the operation member. The second ejection lever is pushed by the first ejection lever to move together with the first ejection lever after the first ejection lever moves a predetermined idling distance.

Preferably, the stop member is a receiving portion elevated perpendicularly from the first ejection lever. The receiving portion may be pushed at its front side by the operation member, and the loading slider may be received on a rear side of the receiving portion.

When the loading slider is driven by the motor via the transmission gear mechanism to unload the disk automatically, the loading slider moves forwards to a position where a front end of the loading slider is substantially in contact with the stop member.

According to a preferred embodiment, the disk device of the present invention further comprises a rack gear and a rack gear engagement control device. The rack gear is engageable with a third gear that belongs to the disk feeding mechanism side of the transmission gear mechanism. The rack gear causes the third gear to turn as the ejection device further moves a predetermined distance after the first gear moves to the disengaged position. Rotation of the third gear is transmitted to the loading slider. Thus, the loading slider is forced to move forward even while the load for ejecting the disk is greater than the driving force of the first spring. The rack gear is preferably provided in the ejection device.

The rack gear engagement control device controls the engagement between the rack gear and the third gear, to keep the rack gear in engagement with the third gear while the ejection device is moving rearward in response to the push of the operation member. The rack gear engagement control device also permits the rack gear to return and slip off the third gear while the ejection device is moving forward along with the pull-out movement of the operation member.

The driving force of the first spring causes the loading slider to move forward after the rack gear returns to disengage from the third gear and while the disk ejection load is smaller than the driving force of the first spring. On the other hand, the loading slider stops moving when the first gear moves into the engaged position, making the disk ejection load greater than the driving force of the first spring.

The rack gear engagement control device includes a third spring, a lug and an aperture. The third spring biases the second ejection lever forward, and also gives a rotational force to the second ejection lever so as to bring the rack gear into engagement with the third gear. The lug is provided on one of the first and second ejection levers, whereas the aperture is provided on the other of the first and second ejection levers. The aperture accepts the lug and is wider than the lug to permit the second ejection lever to swing about a pivotal center. The aperture and the lug are located on an opposite side of the pivotal center of the second ejection lever from the third spring. The lug comes to contact against an end of the aperture after the first ejection lever moves the predetermined idling distance rearward. Then the second ejection lever begins to move rearward together with the first ejection lever.

The second ejection lever has a projection that functions as the clutch, which moves into or get out from under the first gear. When the projection gets out from under the first gear, the first gear may move from the engaged position to the disengaged position.

According to the present invention, in the case of an emergency where the disk must be ejected forcibly using the operation member, the disk is fed to an ejected position along with the pull-out movement of the operation member. Thus, the disk device according to the present invention prevents the crash of the disk against the operator's finger or the like, which may occur when the disk is ejected rashly while the operator's hand is near the slot of the disk device. Therefore, the disk device of the present invention is safer than conventional.

Since the first spring is used for driving the loading slider to move forward to eject the disk, the load and the distance of the operation member to push the loading slider may be light and short in comparison with a case where the loading slider must be pushed with the operation member throughout the forcible ejection. Therefore the operation for the forcible ejection may be easier than conventional.

Moreover, in the first embodiment, while the operation member is being pushed in, the loading slider is received on the stop member of the ejection device, stopping the disk at a position where the disk protrudes a little from the slot on the way to the eject position. Therefore, the disk will not move at once to the eject position, protecting the operator's finger from the crash with the disk that bursts out to the eject position.

In the second embodiment of the present invention, the disk will not burst out of the slot while the operator is pushing the operation member into the disk device. Therefore, the operator may manipulate the operation member more safely.

Moreover, even while the disk ejection load goes above the driving force of the first spring, the loading slider may be moved forward by pushing the ejection device with the operation member in the second embodiment. Therefore, the first spring may have a weaker resiliency, which leads to reduce the load on the motor during the disk loading. Furthermore, the weaker spring force will reduce the risk of damaging the loading slider or guide pins or the like that support the loading slider in a movable fashion.

BRIEF DESCRIPTION OF THE DRAWINGS

The above and other objects and advantages of the present invention will be easily understood from the following description of the preferred embodiments when read in connection with the accompanied drawings, wherein the same reference numerals designate the same or equivalent components throughout the several views.

DESCRIPTION OF THE PREFERRED EMBODIMENTS

Figure 1:
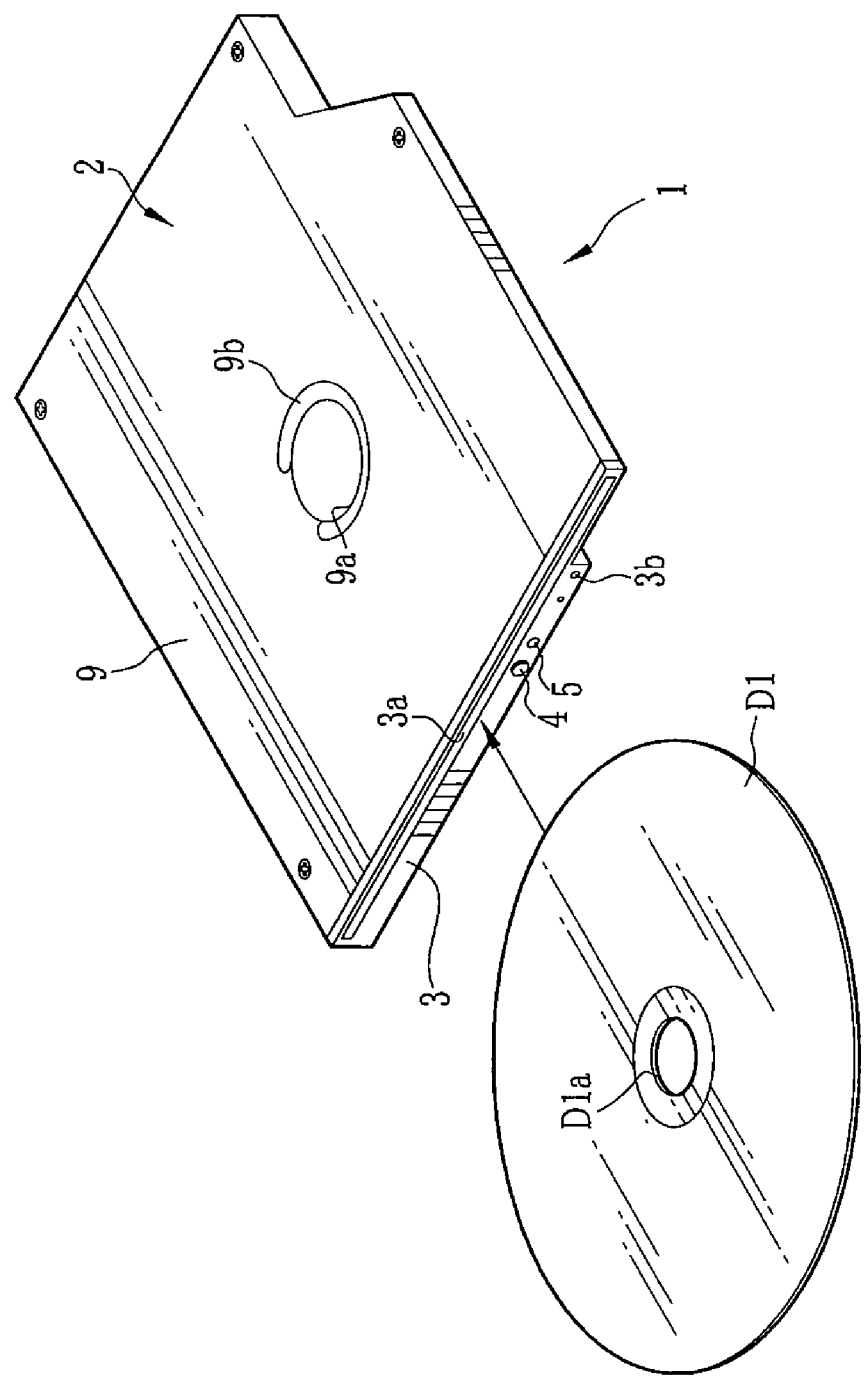
FIG. 1 is a perspective view of a disk device.
Figure 2:
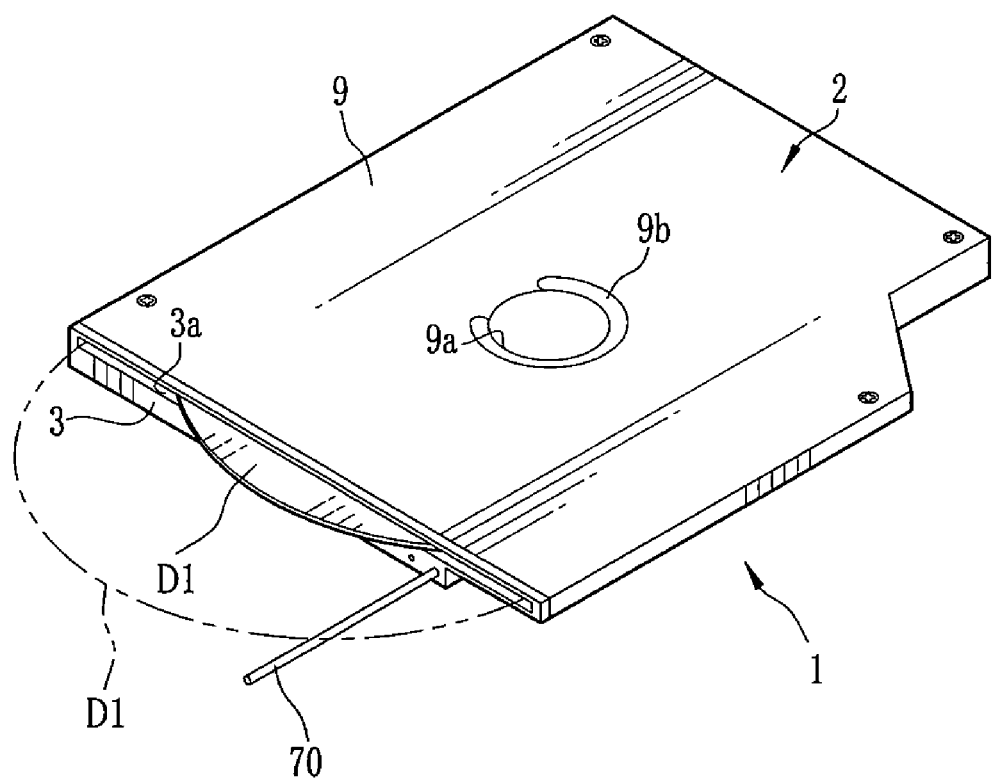
FIG. 2 is a perspective view of the disk device in a condition where a disk is ejected to a half-eject position by forcible disk ejection.

In FIGS. 1 and 2, a disk device 1 is equipped with a case chassis 2 and a bezel 3 at the front side of the case chassis. The bezel 3 is provided with a slot 3a for insertion of a disk D1, an ejection button 4 for instructing ejection of the disk D1, and an indicator 5 for indicating a status of operation of the disk device 1. The disk D1 has a center hole D1a for chuck.

An emergency hole 3b is formed through the bezel 3, for manual forcible ejection of the disk D1 in case of emergency. As illustrated in FIG. 2, when an operation pin 70 is inserted into the emergency hole 3b, the disk D1 is ejected to a half-eject position where the disk D1 protrudes about 20 mm out of the bezel 3. The disk D1 is ejected to a full-eject position as shown by dashed-two dotted lines in FIG. 2, as the operator draws back the operation pin 70 from the emergency hole 3b in the forcible disk ejection.

The case chassis 2 is provided with a top panel 9. An opening 9a is formed through the top panel 9 in a central portion thereof, so that a chuck head 13 (see FIG. 3) slightly fits into the opening 9a to chuck the disk D1. In addition, a recessed portion 9b is formed around the opening 9a, forming an internal protrusion on an internal wall of the case chassis 2. The internal protrusion of the case chassis 2 catches the disk D1 when the chuck head 13 is inserted into a center hole D1a of the disk D1.

Figure 3:
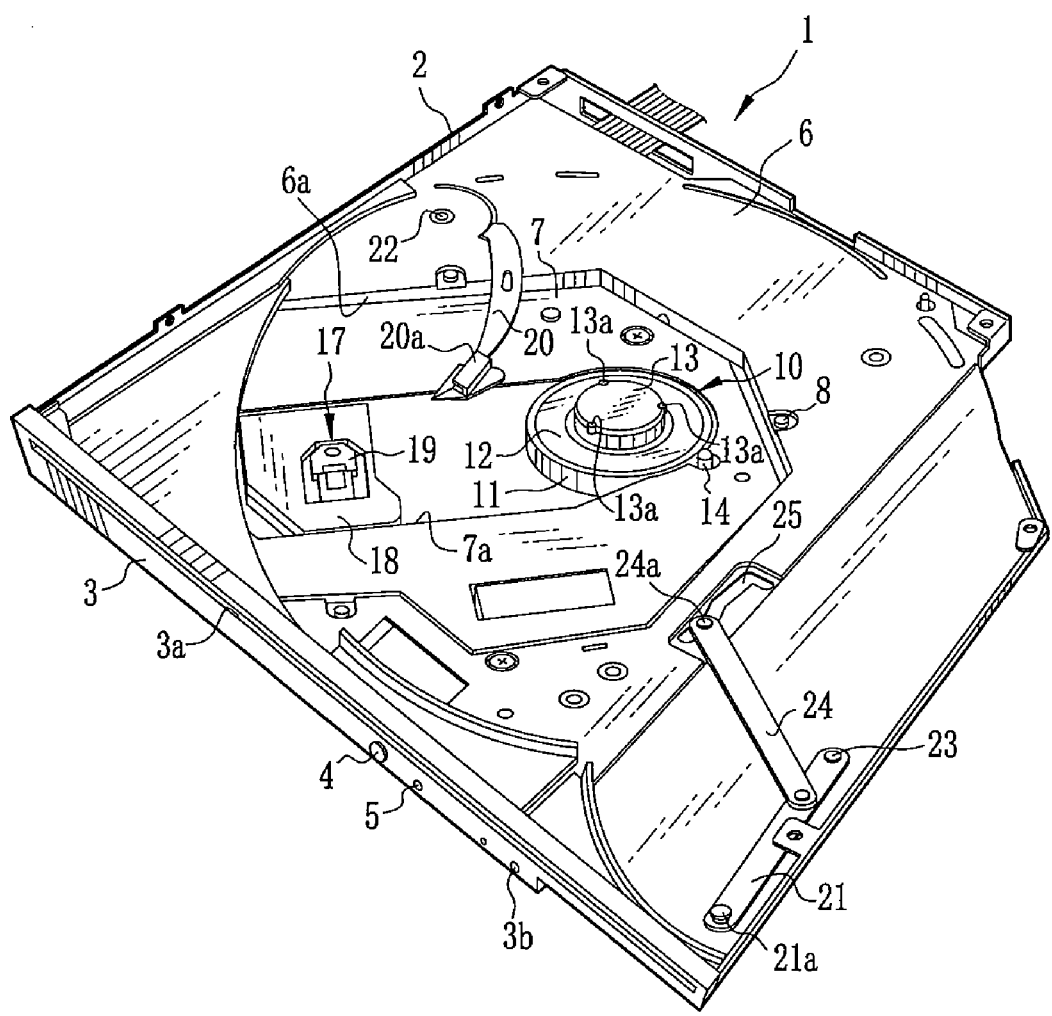
FIG. 3 is a perspective view illustrating the interior of the disk device.
Figure 4:
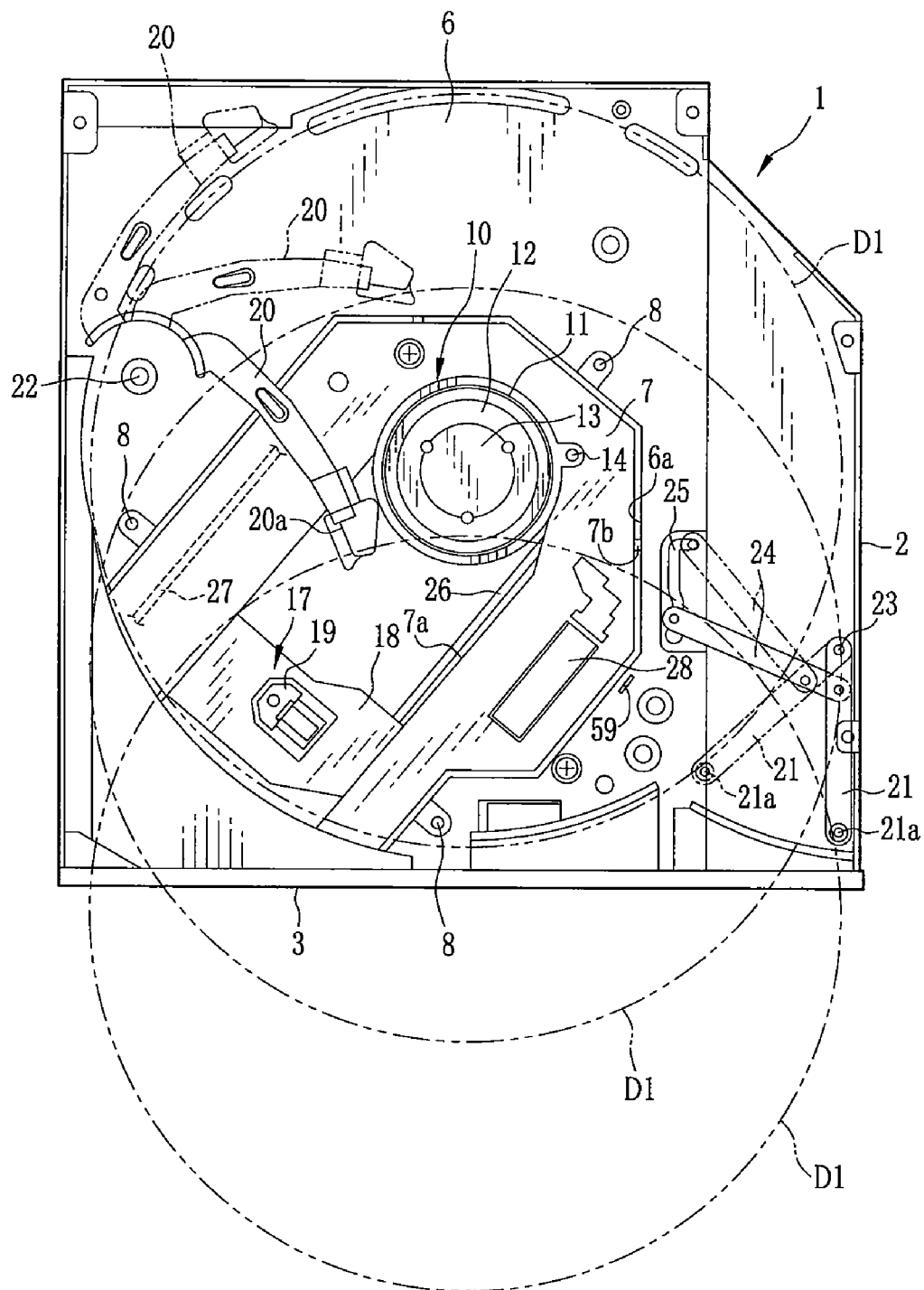
FIG. 4 is a plan illustrating the interior of the disk device.

As shown in FIGS. 3 and 4, a base panel 6 is fixedly secured to the case chassis 2 to split the inside of the case chassis 2 into upper and lower regions. An opening 6a is formed in the base panel 6 and extends diagonally from the center. A lifting frame 7 is disposed in the opening 6a and secured to the base panel 6 at several fixing points through a well-known cushioning support mechanism 8. The lifting frame 7 is mounted pivotal on the side of the bezel 3 such that a distal end of the lifting frame 7 moves up and down in the center of the disk device, while the disk D1 is fed into or out of the case chassis 2. The lifting frame 7 also has an aperture 7a that extends diagonally from the center.

A drive unit 10 is mounted to the distal end of the lifting frame 7. The driving unit 10 includes a spindle motor 11, a turntable 12, and the chuck head 13. The spindle motor 11 is secured to a rear surface of the lifting frame 7, and the turntable 12 is secured to a drive shaft of the spindle motor. The chuck head 13 is formed integrally with the turntable 12.

When the lifting frame 7 moves up, the chuck head 13 fits into the center hole D1a of the disk D1 as located at a chuck position. The chuck head 13 is provided with a plurality of chuck claws 13a, which are biased by a spring so as to latch the disk D1 in a removable fashion. A chuck release pin 14 holds the disk D1 from the bottom such that the disk D1 is separated from the chuck head 13 as the lifting frame 7 moves down.

Moreover, a head unit 17 is mounted to the lifting frame 7. The head unit 17 consists of a carriage 18 exposed through the aperture 7a of the lifting frame 7 and a pick-up head 19 held on the carriage 18. To record information on or reproduce information from the disk D1, the carriage 18 moves along the aperture 7a.

A disk support arm 20 and a loading arm 21 are disposed on the base panel 6. The disk support arm 20 is for loading and unloading the disk D1, whereas the loading arm 21 is for feeding the disk D1 into the case chassis 2 after the disk D1 is fully inserted through the slot 3a. The disk support arm 20 has a holder 20a for holding the leading end of the disk D1 as it is inserted through the slot 3a, and the disk support arm 20 may swing about an axis 22. The loading arm 21 may support the trailing end of the disk D1 with a flanged roller 21a, and swing about an axis 23. A link lever 24 is linked to the loading arm 21, so as to cause the swing of the loading arm 21. The link lever 24 has a pin 24a that moves along a cam groove 25.

In FIG. 4, different positions of the disk D1 are implied by dashed-two dotted lines: the disk D1 is at a full-eject position in an automatic unloading operation, the disk D1 is at a start position of an automatic loading operation, and the disk D1 is at a recording/reproducing position where the disk D1 is completely chucked.

Figure 5:
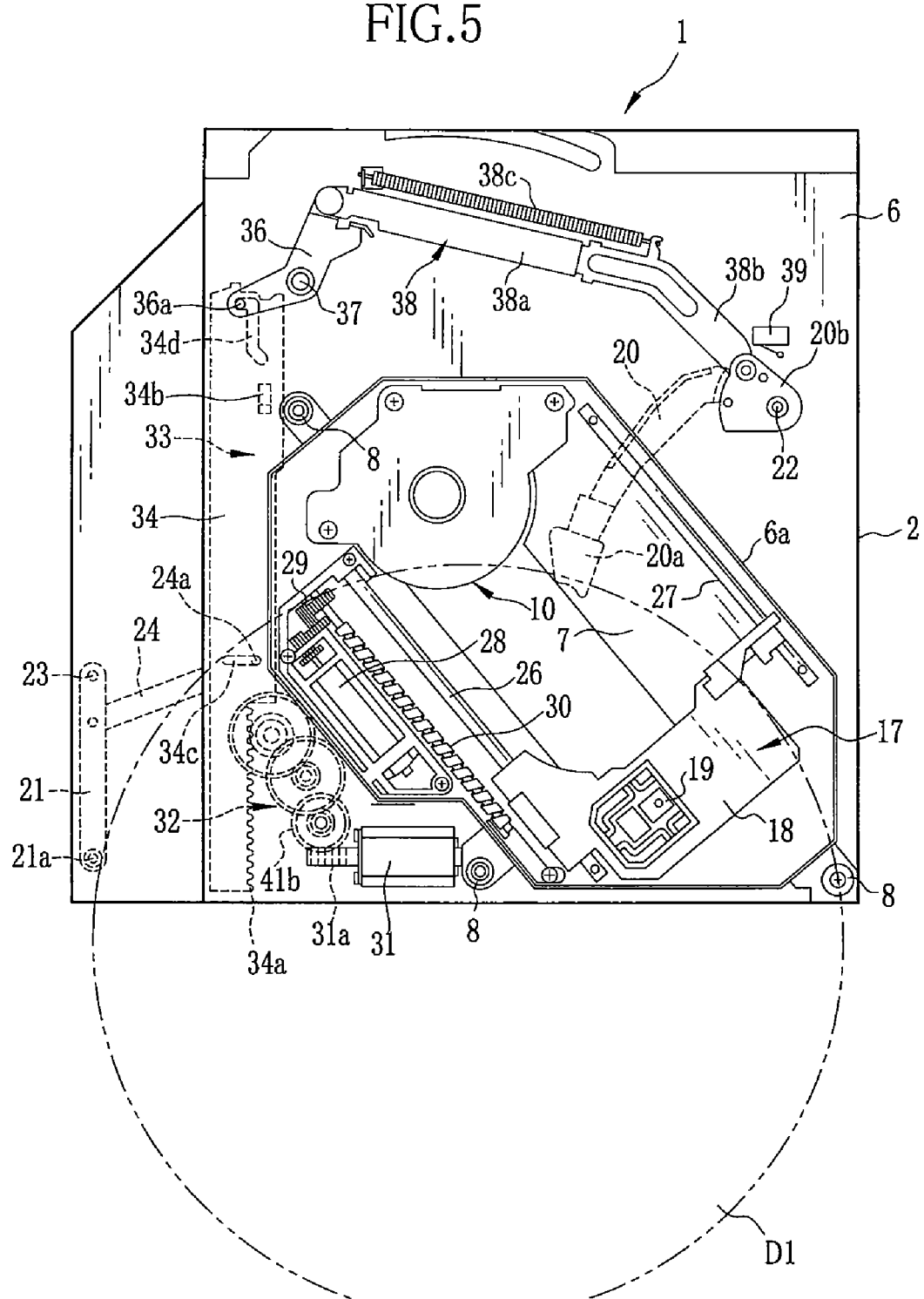
FIG. 5 is a bottom plan illustrating the interior of the disk device.

In FIG. 5, the carriage 18 holding the pickup head 19 thereon is supported by guide shafts 26 and 27. The both ends of the guide shafts 26 and 27 are secured to the rear surface of the lifting frame 7. Rotation of a thread motor 28 is transmitted through a gear train 29 to a screw shaft 30. Rotation of the screw shaft 30 drives the carriage 18 to move back and forth.

A loading motor 31 with a worm gear 31a is disposed behind the base panel 6. Rotation of the loading motor 31 is transmitted through a transmission gear mechanism 32 to a disk feeding mechanism 33, to load or unload the disk D1. The disk feeding mechanism 33 includes a loading slider 34, the disk support arm 20, and the loading arm 21 as main components.

The loading slider 34 is provided with a rack gear 34a, a spring holder hook 34b (see FIG. 8), a cam groove 34c for pushing the pin 24a of the link lever 24, and a cam groove 34d for actuating a link lever 36. The cam groove 34c extends laterally, and pushes the pin 24a in the same direction as the loading slider 34 moves, thereby causing the pin 24a to move along the cam groove 25.

The link lever 36 has a pin 36a that fits in the cam groove 34d of the loading slider 34, so that the link lever 36 rotates about an axis 37 with the movement of the loading slider 34. The link lever 36 is connected to a base section 20b through a link arm 38. The base section 20b is connected to the disk support arm 20 integrally on the axis 22, while the disk support arm 20 is disposed on an obverse surface of the base panel 6. A switch 39 is disposed in the vicinity of the base section 20b. The switch 39 is turned on when the disk support arm 20 swings as a result of insertion of the disk D1 into the case chassis 2. Then the switch 39 outputs a signal to a control circuit (not shown in the drawings), which causes the loading motor 31 to run in a direction to start the automatic loading of the disk D1.

The link arm 38 includes a first arm 38a, a second arm 38b slidably linked to the first arm 38a, and a spring 38c for keeping these arms 38a and 38b in a closest position to each other. This slidable link arm 38 enables the disk support arm 20 to swing without actuating the link lever 36 while a user is inserting the disk D1 into the case chassis 2, that is, before the automatic loading operation starts. While the loading slider 34 is being moved rearward, the spring 38c biases the loading slider 34 forward.

Figure 6:
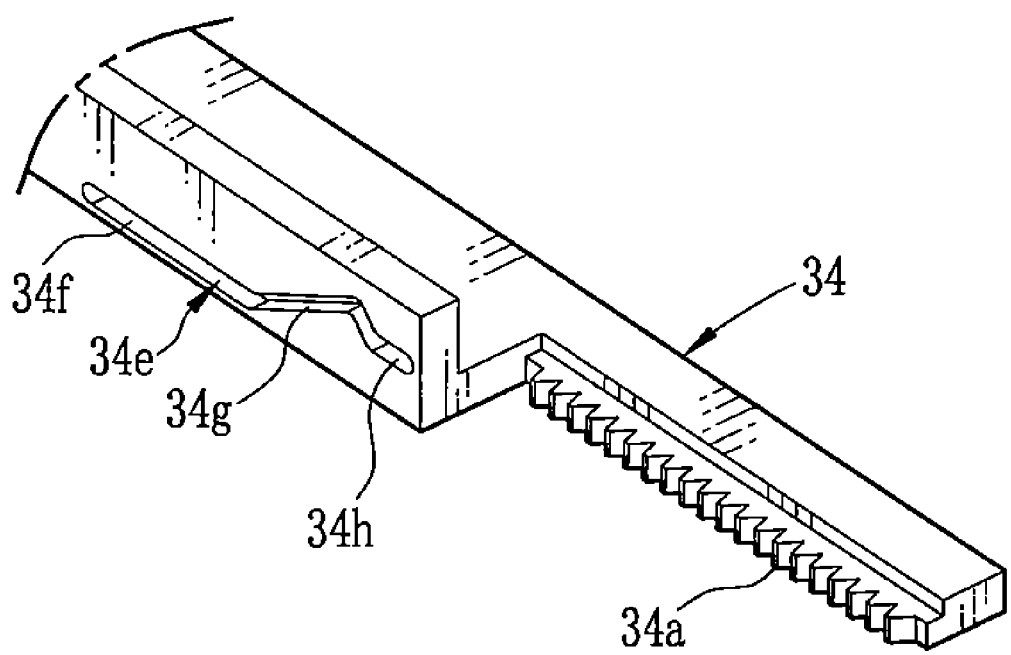
FIG. 6 is a perspective view illustrating a loading slider.

As shown in FIG. 6, the cam groove 34e is formed in one side of the loading slider 34. A lifting pin 7b of the lifting frame 7 is inserted into the cam groove 34e, causing the lifting frame 7 to move up and down. The cam groove 34e has a lower section 34f for maintaining the lifting frame 7 at a lower position, a slant section 34g for lifting or lowering the lifting frame 7, and a higher section 34h for maintaining the lifting frame 7 at a recording/reproducing position, which are formed continually.

Figure 7A:
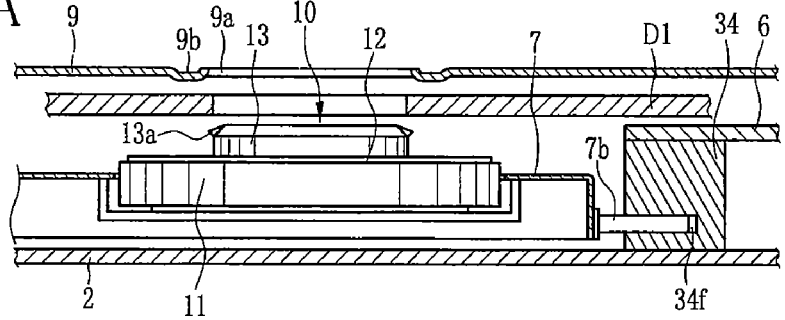
FIGS. 7A to 7D are sections illustrating the operation of a lifting frame.
Figure 7B:
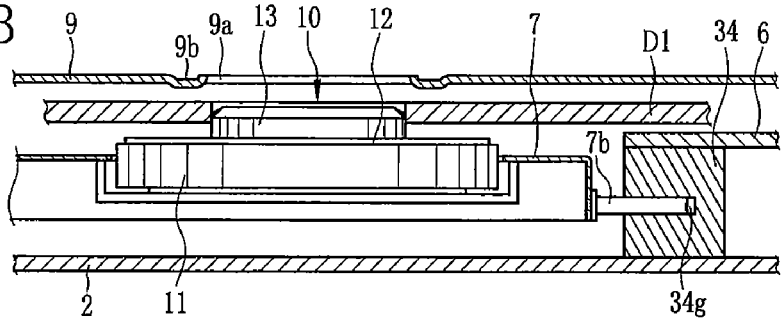
Figure 7C:
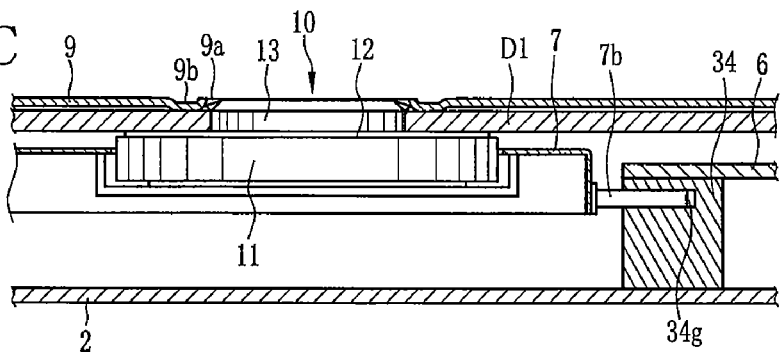
Figure 7D:
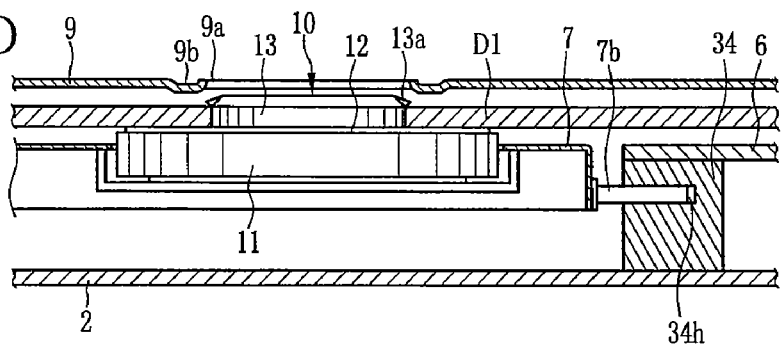

When the lifting pin 7b of the lifting frame 7 is positioned at the lower section 34f of the cam groove 34e, as shown in FIG. 7A, the lifting frame 7 is set at the lower position. As the lifting pin 7b moves from the lower section 34f along the slant section 34g of the cam groove 34e, as shown in FIG. 7B, the lifting frame moves upward and the chuck head 13 moves into the center hole D1a of the disk D1. When the lifting pin 7b moves to the highest point of the slant section 34g, as shown in FIG. 7C, the lifting frame 7 is set at a disk loading position, where the disk D1 is latched by the chuck claws 13a. When the lifting pin 7b moves into the higher section 34h of the cam groove 34e, as shown in FIG. 7D, the lifting frame 7 is set at the recording/reproducing position that is slightly lower than the disk loading position. In the recording/reproducing position, the lifting frame 7 is substantially parallel.

Figure 8:
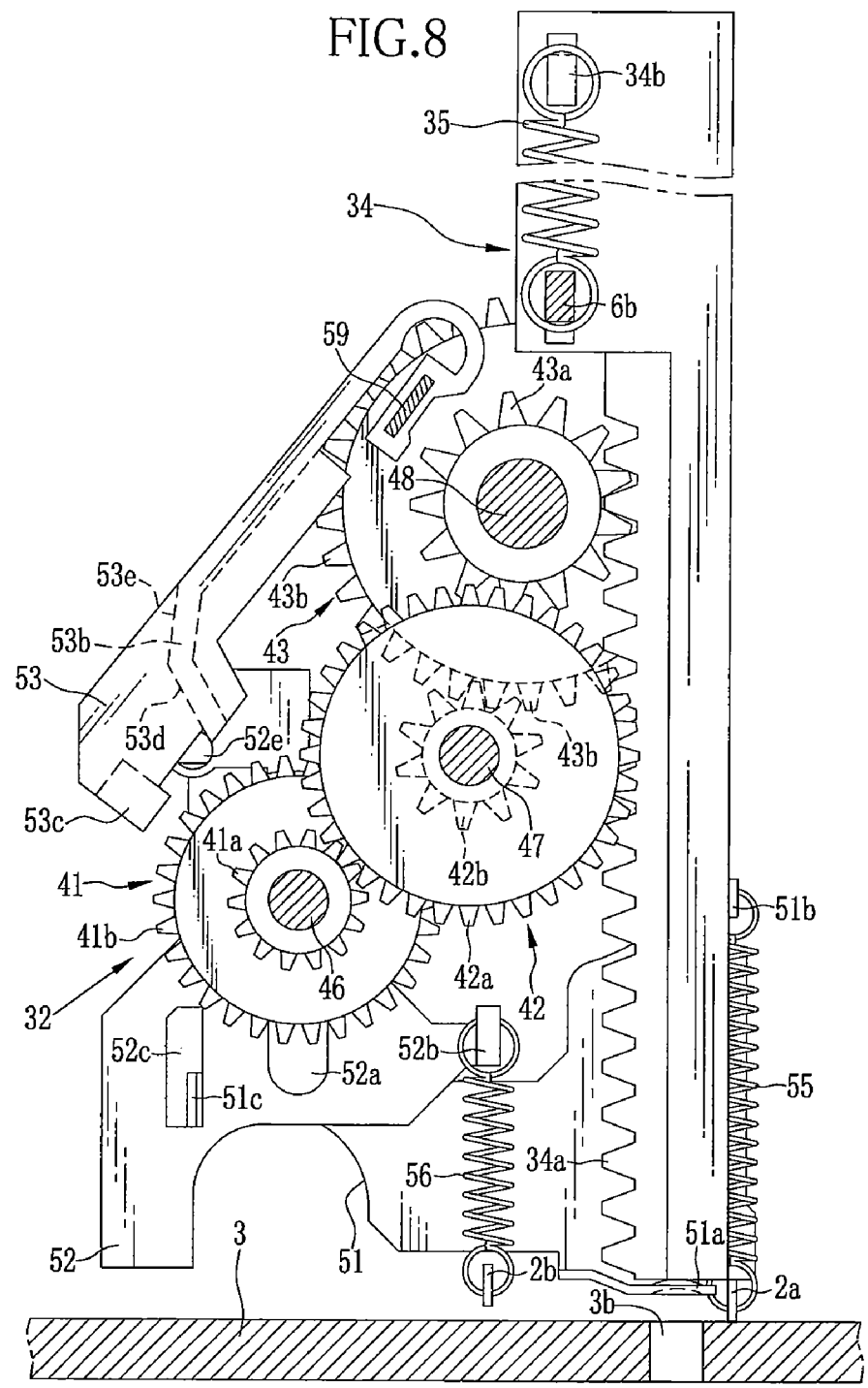
FIG. 8 is a plan illustrating a first embodiment with no disk loaded therein.

Referring to FIGS. 8 to 13, essential components of a first embodiment of the present invention are illustrated. In FIG. 8, one end of a coil spring 35 is hooked on the spring holder hook 34b, and the other end of the coil spring 35 is hooked on a spring holder hook 6b that is provided on the rear side of the base panel 6. The coil spring 35 biases the loading slider 34 forward.

As shown in FIGS. 8 to 11, the transmission gear mechanism 32 includes a first transmission gear 41, a second transmission gear 42, and a third transmission gear 43. The first transmission gear 41 is mounted on a pin 46 that is affixed to the base panel 6, in a manner that the first transmission gear 41 is rotatable and upwardly and downwardly movable. The second and third transmission gears 42 and 43 are rotatably mounted on pins 47 and 48 respectively, which are secured to the base panel 6.

The first transmission gear 41 consists of a small-diameter gear 41a and a large-diameter gear 41b formed integrally on the bottom side of the small-diameter gear 41a. Similarly, the second transmission gear 42 consists of a large-diameter gear 42a and a small-diameter gear 42b, which are formed integrally. The third transmission gear 43 consists of a small-diameter gear 43a and a large-diameter gear 43b, which are formed integrally.

The worm gear 31a, which is fixedly mounted on the rotary axis of the loading motor 31, is in mesh with the large-diameter gear 41b of the first transmission gear 41. The small-diameter gear 41a engages with the large-diameter gear 42a, and the small-diameter gear 42b engages with the large-diameter gear 43b.

Figure 9:
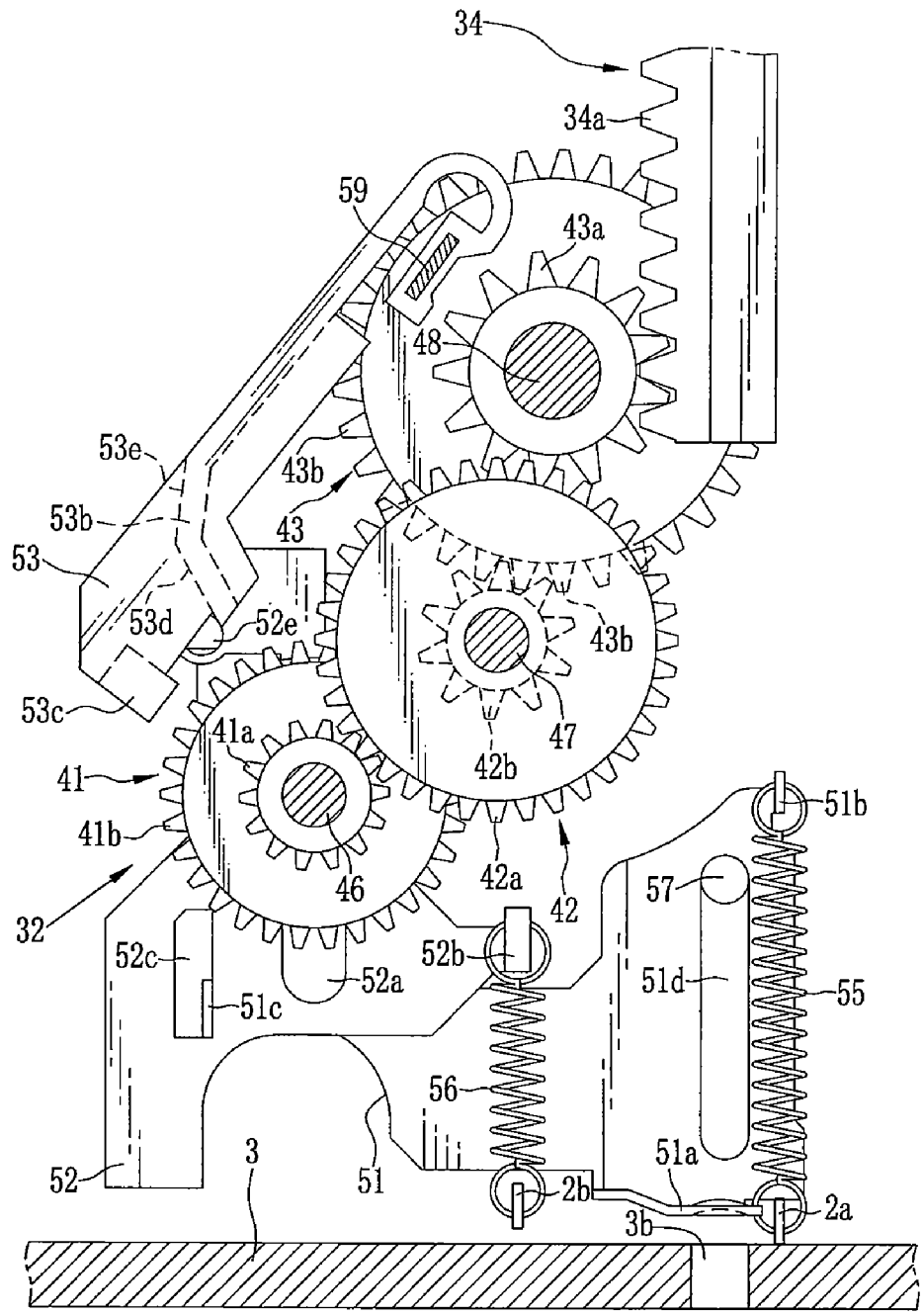
FIG. 9 is a plan illustrating the same as FIG. 8 but with a disk loaded therein.
Figure 10:
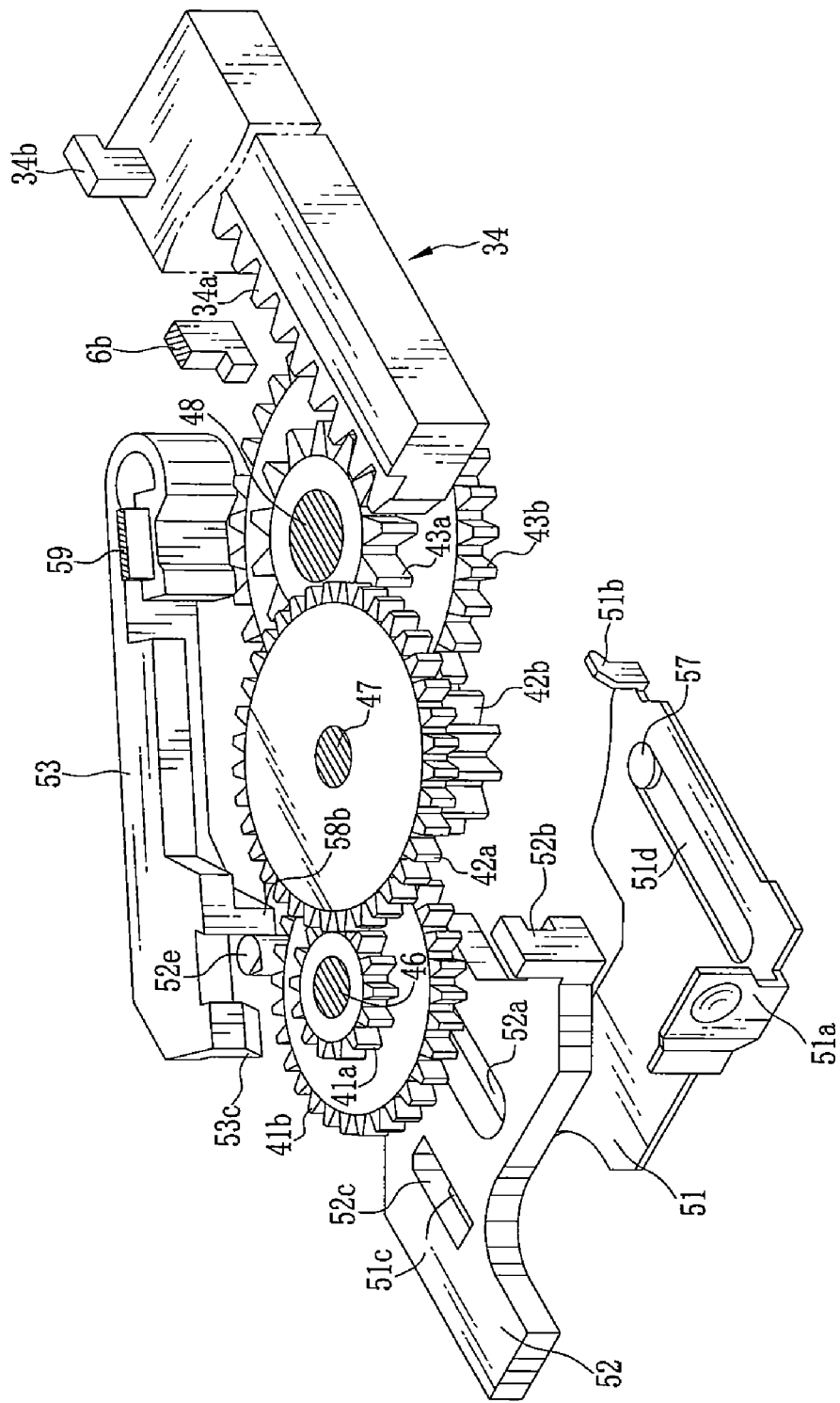
FIG. 10 is a perspective view illustrating the first embodiment with a disk loaded therein.
Figure 11:
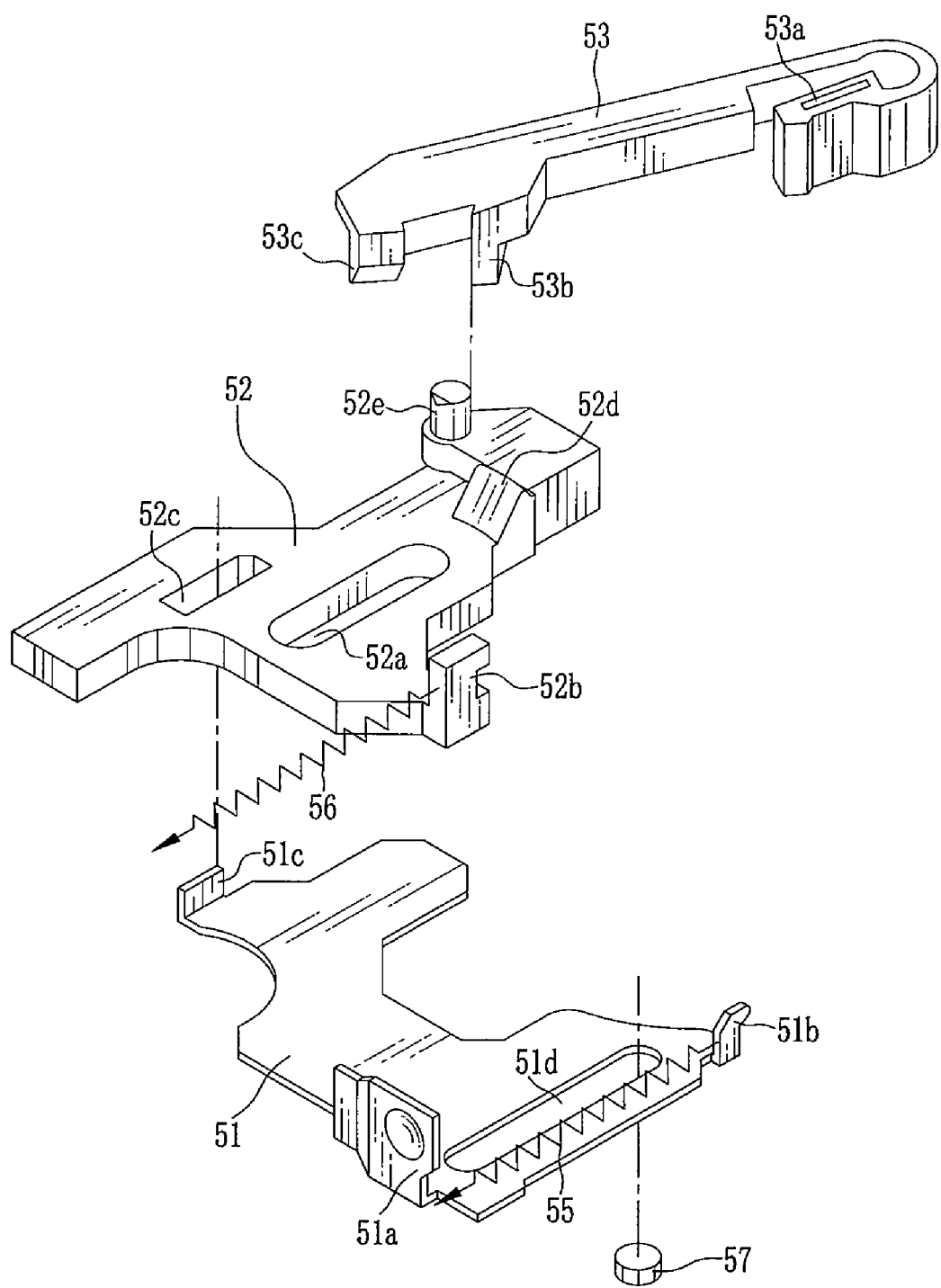
FIG. 11 is an exploded perspective view illustrating first and second ejection levers and a disengaging lever.

The loading slider 34 is installed in a manner that it is movable back and forth between the full-eject position shown in FIG. 8 and the disk loading position shown in FIG. 9. The rack gear 34a of the loading slider 34 engages with the small-diameter gear 43a. The rotation of the loading motor 31 is transmitted to the rack gear 34a via the large-diameter gear 41b, small-diameter gear 41a, large-diameter gear 42a, small-diameter gear 42b, large-diameter gear 43b, and small-diameter gear 43a, thereby to move the loading slider 34.

When the loading slider 34 moves rearward, which is a direction away from the bezel 3, the disk D1 is moved inward of the case chassis 2. When the loading slider 34 moves forward, which is a direction toward the bezel 3, the disk D1 is moved outward of the case chassis 2 to the full-eject position.

A first ejection lever 51 is installed below the first transmission gear 41. A second ejection lever 52 is placed on the first ejection lever 51. Both levers 51 and 52 are attached to the case chassis 2 in a manner that they are movable back and forth. A disengaging lever 53, which is provided for releasing the engagement between the small-diameter gear 41a and the large-diameter gear 42a in a forcible manner, is installed behind the base panel 6 and above the second ejection lever 52. The first and second ejection levers 51 and 52 can be formed as an integral body.

The first ejection lever 51 is formed with a receiving lug 51a for receiving the loading slider 34 and an operation pin 70, a spring holder 51b, a pushing lug 51c for pushing the second ejection lever 52, and an elongated guide slot 51d. The first ejection lever 51 is made of a thin metal plate, and the elements 51a to 51c are formed by bending the metal plate. The receiving lug 51a is elevated perpendicularly from the first ejection lever 51 and has a concave portion and a convex portion on the front and rear sides thereof respectively. The concave portion is for accepting the operation pin 70, whereas the convex portion is for receiving the loading slider 34. On the spring holder 51b, a coil spring 55 is hooked at its one end, and the other end of the coil spring 55 is hooked on a spring holder hook 2a that is provided on the case chassis 2. The coil spring 55 biases the first ejection lever 51 forward. A fastening pin 57, which is formed on the case chassis 2, is inserted into the guide slot 51d.

The second ejection lever 52 is formed with a through-hole 52a into which the pin 46 is inserted, a spring holder 52b, and an aperture 52c into which the pushing lug 51c is inserted. The second ejection lever 52 further has a clutch projection 52d for pushing up the first transmission gear 41 to the position engaged with the second transmission gear 42, and a boss 52e for driving the disengaging lever 53 to swing. To bias the second ejection lever 52 forward, a coil spring 56 is hooked at its one end on the spring holder 52b, and the other end of the coil spring 56 is hooked on a spring holder hook 2b that is provided on the case chassis 2. The second operation lever 52 can swing about the pin 46 against the coil spring 56 in a range corresponding to the difference between the width of the aperture 52c and the plate thickness of the pushing lug 51c. Note that illustrations of the coil springs 35, 55, and 56 are omitted from FIG. 10.

Figure 12:
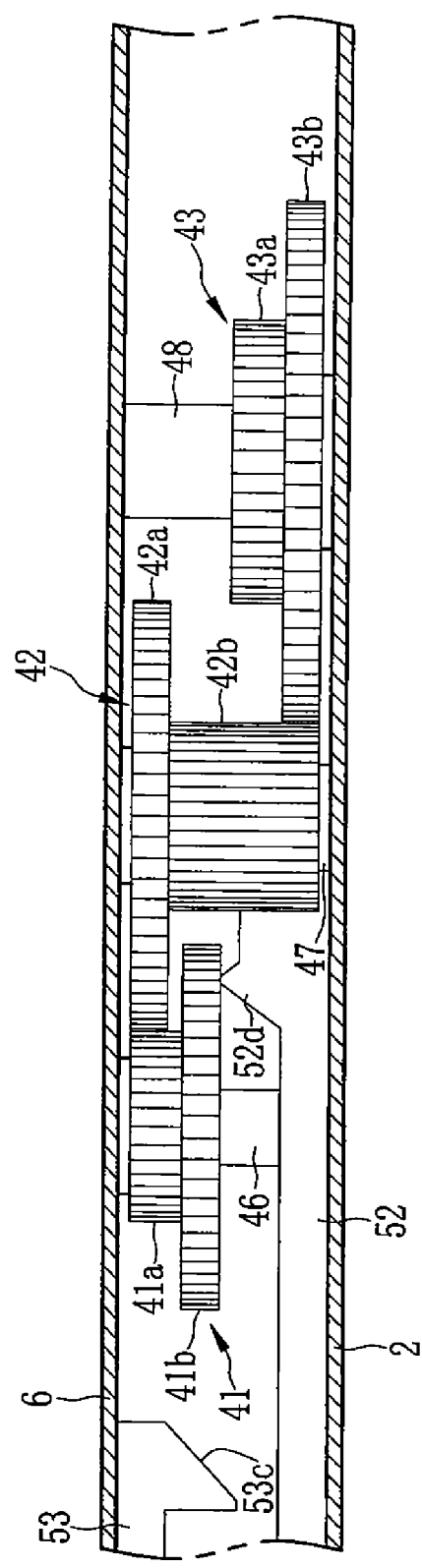
FIG. 12 is a side view illustrating a transmission gear mechanism in a condition where a first transmission gear is in an engaged position.
Figure 13:
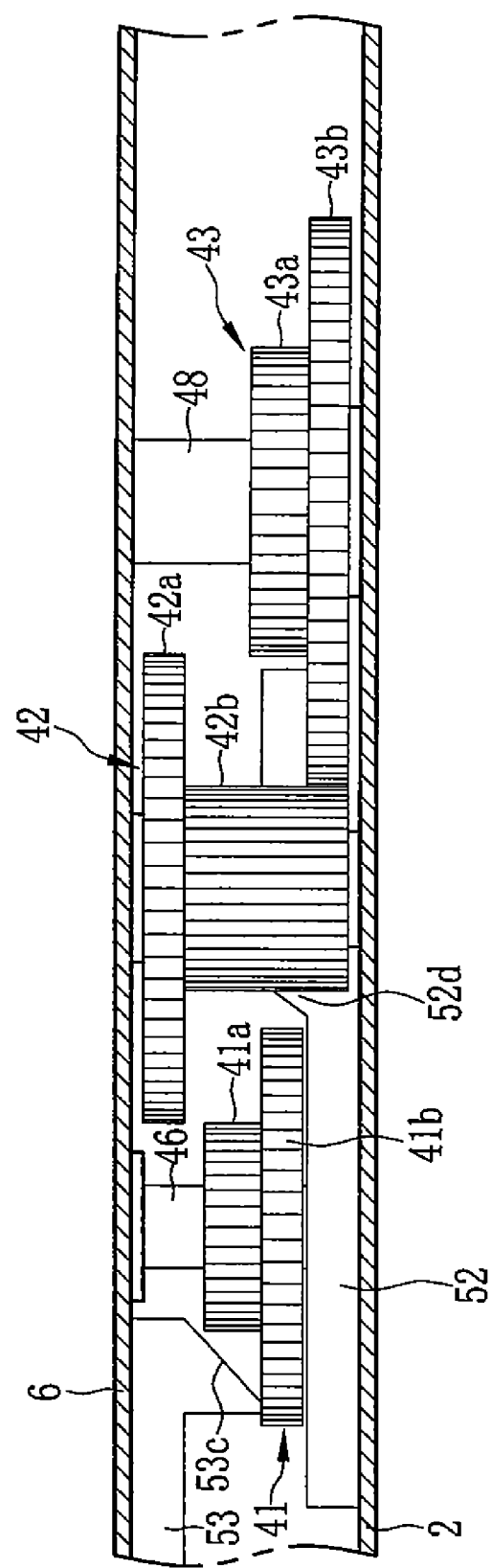
FIG. 13 is a side view illustrating the transmission gear mechanism in another condition where the first transmission gear is moved to a disengaged position.

As shown in FIGS. 12 and 13, as the second ejection lever 52 moves rearward, the clutch projection 52d gets out from under the large-diameter gear 41b, enabling the first transmission gear 41 to move down. When the first transmission gear 41 moves down, the engagement between the small-diameter gear 41a and large-diameter gear 42a is released. On the contrary, as the second ejection lever 52 moves forward, the clutch projection 52d comes under the large-diameter gear 41b, pushing up the first transmission gear 41. The clutch projection 52d has a triangular shape with a slant face so that the clutch projection 52d can easily get into under the large-diameter gear 41b.

The disengaging lever 53 is attached to a rectangular support plate 59 that is affixed to the base panel 6. The disengaging lever 53 has resiliency (spring force) for sway around the support lug 59. The disengaging lever 53 is formed with a rectangular attachment hole 53a, into which the support plate 59 is inserted, a rib 53b that contacts against the boss 52e, and a tapered push-down protrusion 53c, which forcibly pushes down the first transmission gear 41 to the disengaged position. The rib 53b includes a first slant section 53d that is pushed by the boss 52e to cause the disengaging lever 53 to swing counterclockwise, and the second slant section 53e that hinders clockwise swing (return) of the disengaging lever 53. The push-down protrusion 53c is placed above the large-diameter gear 41b after the clutch projection 52d of the second ejection lever 52 gets out from under the large-diameter gear 41b.

Now the operation of the disk device 1 will be described. Before the disk D1 is inserted, the loading slider 34 is moved to the eject position, as shown in FIG. 8, and the ejection levers 51 and 52 are moved forward of the coil springs 55 and 56. In this position, as shown in FIG. 12, the first transmission gear 41 is pushed up by the clutch projection 52 to the engaged position, so that the small-diameter gear 41a is in mesh with the large-diameter gear 42a.

When the disk D1 is inserted through the slot 3a of the bezel 3, as shown in FIG. 4, the leading end of the disk D1 is received on and held by the holder 20a of the disk support arm 20. As the disk D1 is pushed into the slot 3a, the disk support arm 20 swings together with its base portion 20b about the axis 22 in a clockwise direction in FIG. 5, while stretching the link arm 38 against the force of the spring 38c.

When the disk support arm 20 is further pushed by the disk D1, the base portion 20b turns the switch 39 on, and the switch 39 outputs a signal, upon which the loading motor 31 is actuated. Then, rotational movement of the loading motor 31 is transmitted through the first transmission gear 41, the second transmission gear 42 and the third transmission gear 43 to the loading slider 34, causing the loading slider 34 to move rearward.

As the loading slider 34 moves rearward, the cam groove 34c pushes the pin 24a of the link lever 24 rearward, causing the pin 24a to move along the cam groove 25. The movement of the pin 24a and hence the link lever 24 causes the loading arm 21 swings about the axis 23 in a clockwise direction in FIG. 4. Thereby, the loading arm 21 pushes the trailing end of the disk D1 by the flanged roller 21a at the distal end thereof.

The loading slider 34 causes the link lever 36 to turn in a clockwise direction in FIG. 5, through the cam groove 34d. The clockwise turn of the link lever 36 is transmitted through the link arm 38 to the base portion 20b, causing the disk support arm 20 to swing clockwise in FIG. 5. Thus, the disk D1, being held between the disk support arm 20 and the loading arm 21, is fed into the case chassis 2.

When the disk D1 is fed to the chuck position, as shown in FIG. 7A, the center hole D1a of the disk D1 is aligned with the chuck head 13. At this point, the lifting pin 7b of the lifting frame 7 comes to the slant section 34g of the cam groove 34e of the loading slider 34. Thereafter, while the disk support arm 20 and the loading arm 21 are kept stationary, the lifting pin 7b moves along the slant section 34g in cooperation with the loading slider 34, causing the lifting frame 7 to moves upward from the lower position shown in FIG. 7A.

As shown in FIG. 7B, the upward movement of the lifting frame 7 brings the chuck head 13 slightly into the center hole D1a of the disk D1. When the chuck head 13 further pushes the disk D1 upward, as shown in FIG. 7C, the disk D1 comes into contact with the internal protrusion of the case chassis 2, which is formed by the recessed portion 9b of the top plate 9, so that the chuck head 13 fits into the center hole D1a sufficiently enough to latch the disk D1 by the chuck claws 13a. After the disk D1 is chucked, the lifting frame 7 moves a little downward so as to set the disk D1 away from the top plate 9, as shown in FIG. 7D, while the lifting pin 7b moves into the higher section 34h of the cam groove 34e. Thus, the lifting frame 7 is set at the recording/reproducing position that is slightly lower than the disk loading position.

The disk support arm 20 and the loading arm 21, which hold the disk D1 stationary during the chuck operation, move off the disk D1 and hence release the disk D1 in response to a final stroke of the loading slider 34, which is made after the chuck operation is complete. At the same time as the disk support arm 20 and the loading arm 21 release the disk D1, the loading slider 34 turns on a switch (not shown) to stop the loading motor 31 and hence the loading operation of the disk D1. After the disk D1 is thus loaded, the disk D1 is turned at a high speed while the head unit 17 is being driven to record data onto or reproduce data from the disk D1.

To unload the disk D1 automatically from the case chassis 2, an instruction therefor is entered by operating the push button 4 of the bezel 3, or the instruction is sent from an information technology device to the disk device 1. Upon this instruction, the control circuit of the disk device 1 first stops the spindle motor 11, and then runs the loading motor 31 reversely. The reversed rotation of the loading motor 31 causes the loading slider 34 to move forward.

When the loading slider 34 begins to move forward, the disk support arm 20 and the loading arm 21 slightly swing to hold the disk D1 at its circumference. Next, the lifting frame 7 moves from the position of FIG. 7D to the position of FIG. 7A. At first, the lifting frame 7 moves slightly upward from the recording/reproducing position and then moves down to the lower position. During the downward movement of the lifting frame 7, the disk D1 is received on the chuck release pin 14, which leads to separating the disk D1 from the chuck head 13. After the lifting frame 7 comes to the lower position, the disk support arm 20 and the loading arm 21 swing again to feed the disk D1 out to the full-eject position of the automatic unloading operation, as shown in FIG. 5.

Since the loading slider 34 is moved by the loading motor 31 in the automatic unloading operation, the loading slider 34 is substantially in contact with the first ejection lever 51, as shown in FIG. 8, when the disk D1 has been fed out from the case chassis 2 by the automatic unloading operation. Accordingly, if the operation pin 7 is put into the emergency hole 3b by mistake after the disk D1 is automatically ejected from the case chassis 2, the first ejection lever 51 would not be displaced, so the first ejection lever 51, the second ejection lever 52 or other components may not be disordered by this mistake.

Figure 14:
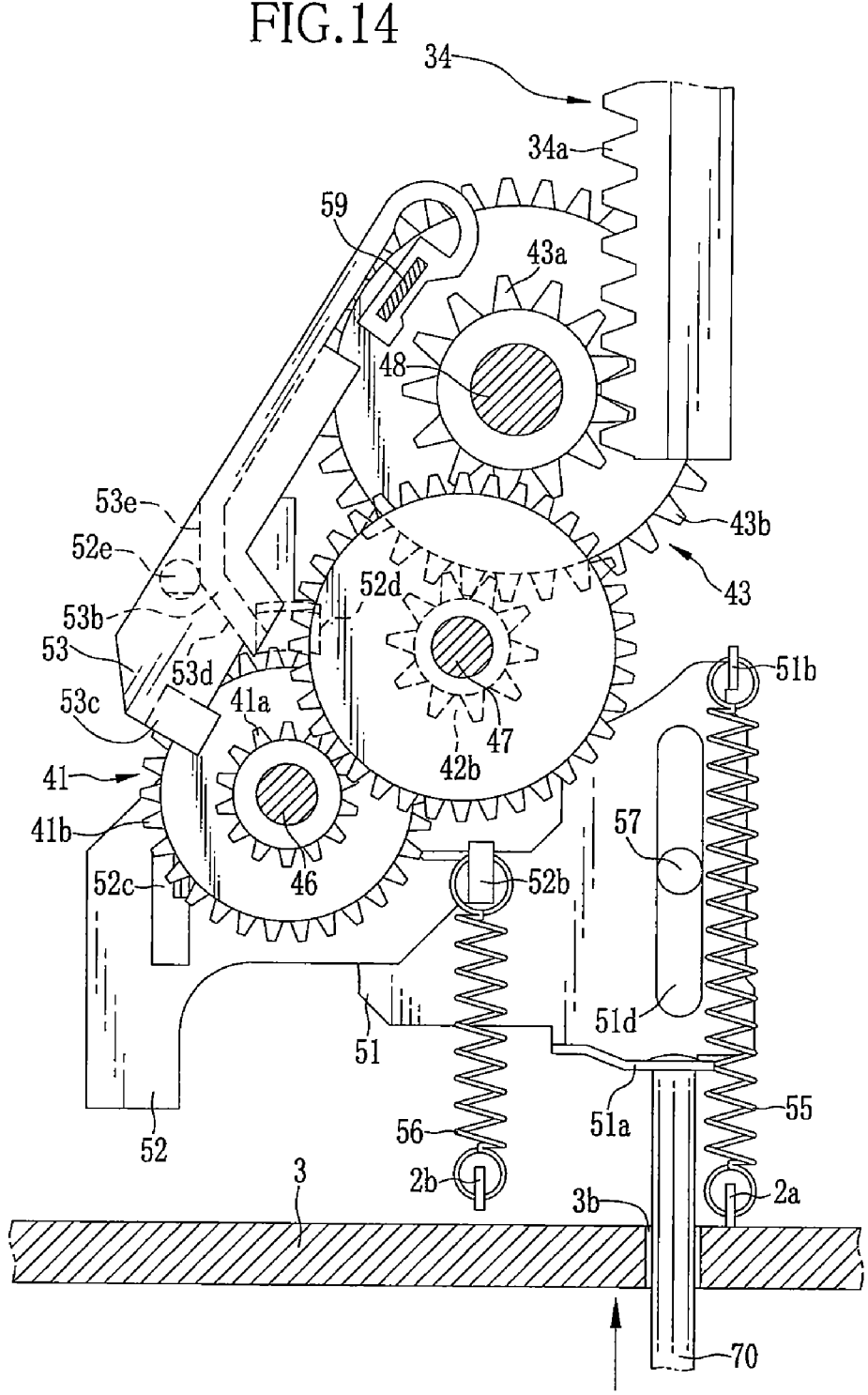
FIG. 14 is a plan illustrating the first embodiment in a condition where the first transmission gear is moved to the disengaged position by pushing an operation pin into an emergency hole.
Figure 15:
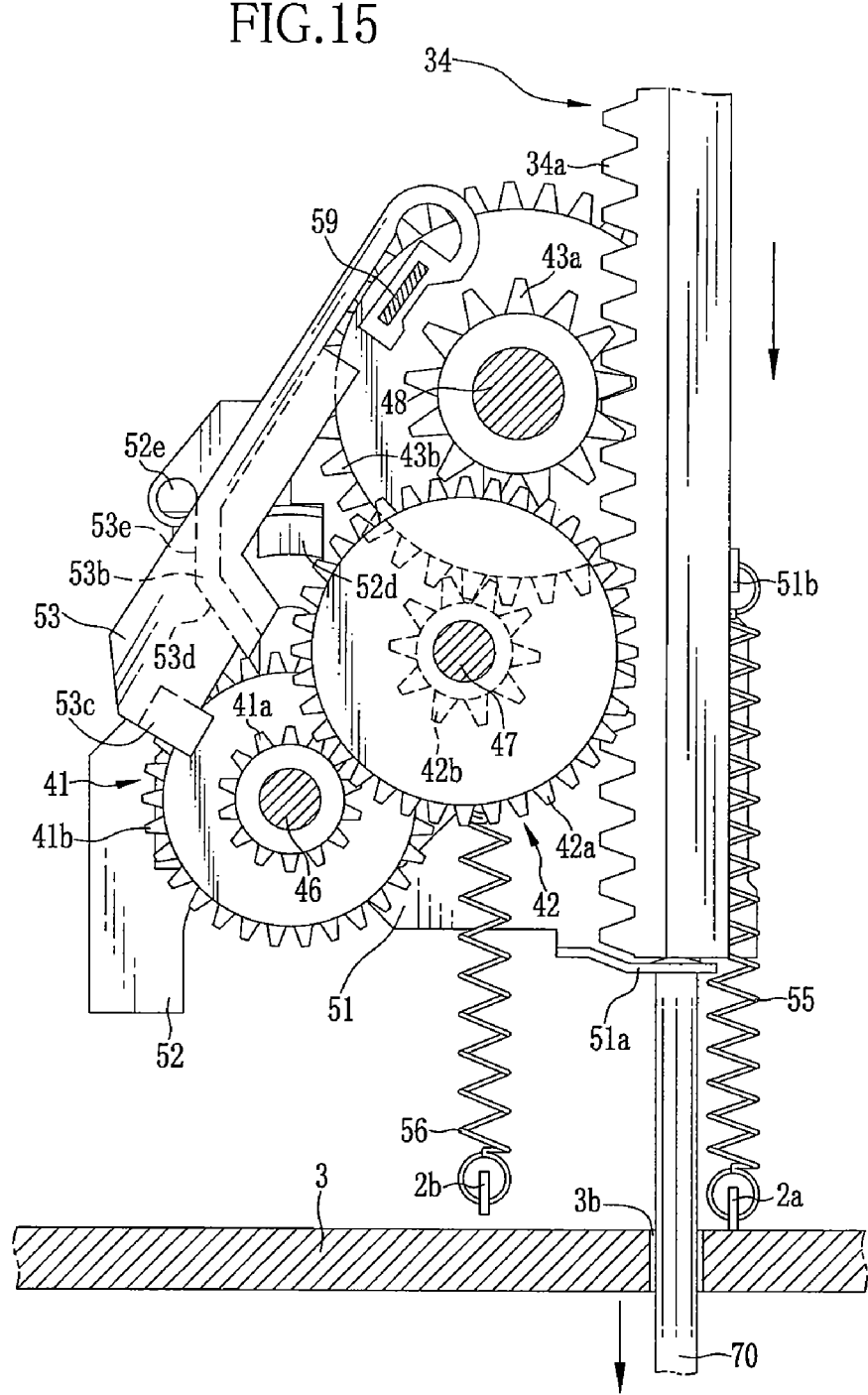
FIG. 15 is a plan illustrating the first embodiment in a condition where the loading slider is moved to the half-eject position.
Figure 16:
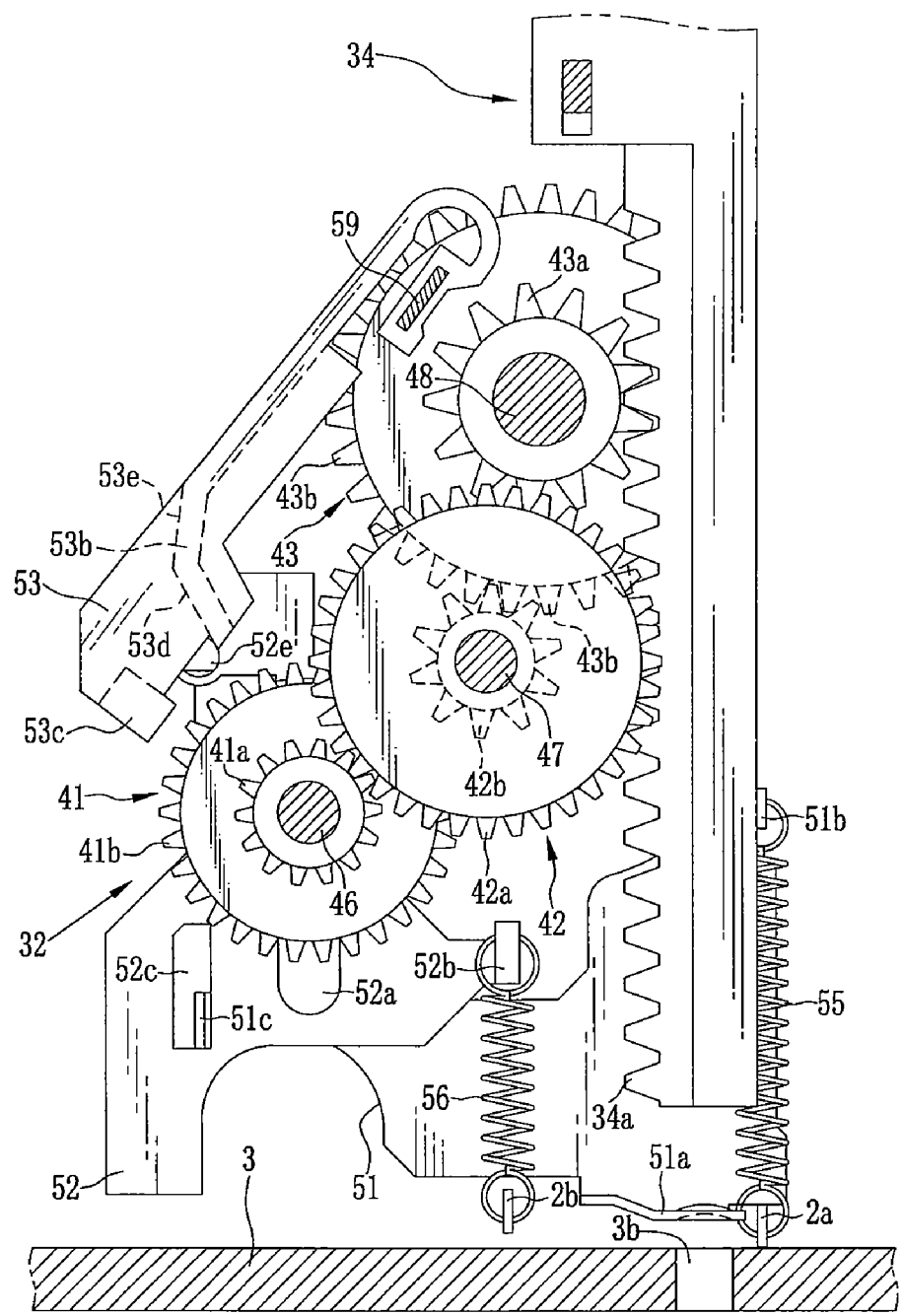
FIG. 16 is a plan illustrating the first embodiment in a condition where the loading slider is moved to a full-eject position.

On the other hand, the loading motor 31 can accidentally stop running for some reasons, such as battery-rundown, power shutdown or failure, while the disk device 1 is operating with a disk D1 loaded therein. In that case, the disk D1 cannot be automatically fed out from the case chassis 2. In such an emergency, the disk D1 may be forcibly ejected from the case chassis 2 by inserting the operation pin 70 into the emergency hole 3b, as shown in FIGS. 14 to 16.

The forcible ejection of the disk D1 according to the first embodiment is carried out in a manner as set forth below. As shown in FIG. 14, when the operation pin 70 is pushed into the emergency hole 3b, the first ejection lever 51 is moved rearward against the biasing force of the coil spring 55. When the first ejection lever 51 moves about 2 mm (an idling distance) rearward, the pushing lug 51c comes to contact against the rear end of the aperture 52c of the second ejection lever 5. Thereafter, the second ejection lever 52 moves rearward together with the first ejection lever 51.

When the operation pin 70 is further pushed into the emergency hole 3b to move the ejection levers 51 and 52 farther 2 mm in the rearward direction, the clutch projection 52d removes off the bottom surface of the first transmission gear 41, as shown in FIG. 13, enabling the first transmission gear 41 to move downward according to its own weight. Simultaneously therewith or immediately thereafter, the boss 52e sequentially pushes the first and second slant sections 53d and 53e of the rib 53b, as shown in FIG. 14. When the boss 52e pushes the first slant section 53d, the disengaging lever 53 swings counterclockwise about the support plate 59, which brings the push-down protrusion 53c to the position above the large-diameter gear 41b of the first transmission gear 41. As a result, the first transmission gear 41 may be pushed down to the disengaged position even if it stays at the engaged position. Since the push-down protrusion 53c moves onto the top side of the large-diameter gear 41b after the clutch projection 52d gets out from under the large-diameter gear 41b, the push-down protrusion 53c can securely push down the first transmission gear 41 to disengage it from the second transmission gear 42, without the danger that the clutch projection 52d or the push-down protrusion 53c interferes with the first transmission gear 41 and crashes down.

The boss 52e pushes the first slant section 53d to swing the disengaging lever 53, and gets into contact with the second slant section 53e, which is oriented substantially perpendicular as a result of the swing of the disengaging lever 53. Once the boss 52e contacts against the second slant section 53e, the disengaging lever 53 is stopped from returning to the initial position in spite of its own resiliency, and is kept in this position.

When the first transmission gear 41 is pushed down to the disengaged position, the transmission gear mechanism 32 is separated into the motor side and the disk feeding mechanism side. In the present embodiment, the first transmission gear 41 is on the motor side, whereas the second transmission gear 42 and the third transmission gear 43 are on the side of the disk feeding mechanism.

When the transmission gear mechanism 32 is separated into the motor side and the disk feeding mechanism side, the third transmission gear 43 will be able to turn without the large rotational load of the worm gear 31a. Therefore, the biasing force of the coil spring 35 causes the loading slider 34 to move forward, turning the third transmission gear 43 in a direction to start ejecting the disk D1.

As shown in FIG. 15, even after the first transmission gear 41 is disengaged from the second transmission gear 42 by pushing the operation pin 70 into the emergency hole 3b, the operation pin 70 is pushed further into the emergency hole 3b. Accordingly, the ejection levers 51 and 52 still move about 4 mm rearward till a front edge of the guide slot 51d of the first ejection lever 51 contacts against the guide pin 57.

As the loading slider 34 moves forward, the front end of the loading slider 34 comes into contact with the receiving lug 51a of the first ejection lever 51, so that the loading slider 34 stops at the half-eject position. When the loading slider 34 stops at the half-eject position, the disk D1 stops at a position protruding about 20 mm out of the bezel 3, as shown by solid lines in FIG. 2. Thus, the disk D1 will not crash against the fingers when it is forcibly ejected by the emergent manual operation.

As the operation pin 70 is pulled out of the emergency hole 3b, the ejection levers 51 and 52 move forward according to the force of the coil spring 55 and 56. Along with the forward movement of the ejection levers 51 and 52, the loading slider 34 moves forward according to the force of the coil spring 35.

When the second ejection lever 52 moves forward following the pull-out movement of the operation pin 70, the pressure of the boss 52e onto the disengaging lever 53 is released, so that the disengaging lever 53 returns to the initial position, as shown in FIG. 16. When the disengaging lever 53 returns to the initial position, the push-down protrusion 53c moves off the top side of the first transmission gear 41, allowing the first transmission gear 41 to move upward. Thereafter, as shown in FIG. 12, the clutch projection 52d comes into contact with the bottom side of the first transmission gear 41, and pushes the first transmission gear 41 up to the engaging position, where the first transmission gear 41 engages with the second transmission gear 42.

Once the first transmission gear 41 engages with the second transmission gear 42, the worm gear 31a applies the large load to the loading slider 34, to stop the forward movement. At this time, the disk support arm 20 and the loading arm 21 have fed the disk D1 out to the full-eject position as shown by dashed-two dotted lines.

The disk ejection load, i.e. the load necessary for ejecting the disk D1, will increase when the lifting frame 7 moves from the recording/reproducing position shown in FIG. 7D to the disk loading position shown in FIG. 7C and the disk D1 is pressed against the top plate 9, or when the chuck head 13 is removed from the center hole D1a of the disk D1 by moving only the lifting frame 7 downward immediately after it goes past the position shown in FIG. 7B where the chuck release pin 14 supports the disk D1 from the bottom and hence stops the disk D1 from moving downward. However, because the driving force (resilient force) of the coil spring 35 is greater than the disk ejection load, the disk ejection load will not stop the motion of the loading slider 34, so the disk D1 is fed out to the half-eject position as shown by solid lines in FIG. 2

The second ejection lever 52 stops the forward movement when the first transmission gear 41 completely engages with the second transmission gear 42. Thereafter, the first ejection lever 51 alone further moves forward. Accordingly, as shown in FIG. 16, the front end of the loading slider 34 is a little set away from the receiving lug 51a of the first ejection lever 51 in the forcible ejection of the disk D1.

In the above-described first embodiment, the disk D1 is ejected to the position shown by the solid lines in FIG. 2 in response to a push of the operation pin 70, and thereafter, the disk D1 is ejected to the position shown by dashed-two dotted lines in FIG. 2 along with the pull-out movement of the operation pin 70. Following the operation pin 70, the loading slider 34 is moved forward by the driving force of the coil spring 35. Therefore, the coil spring 35 is required to have a sufficiently large driving force. If it is possible to make use of the pushing force of the operation pin 70 as an additional force to the driving force of the coil spring 35, the force of the coil spring 35 may be reduced. Reducing the force of the coil spring 35 results in reducing the load on the loading motor 31. In a second embodiment illustrated in FIGS. 17 to 25, the pushing force of the operation pin 70 is utilized for forcible disk ejection in combination with a biasing force of a coil spring 56.

Figure 17:
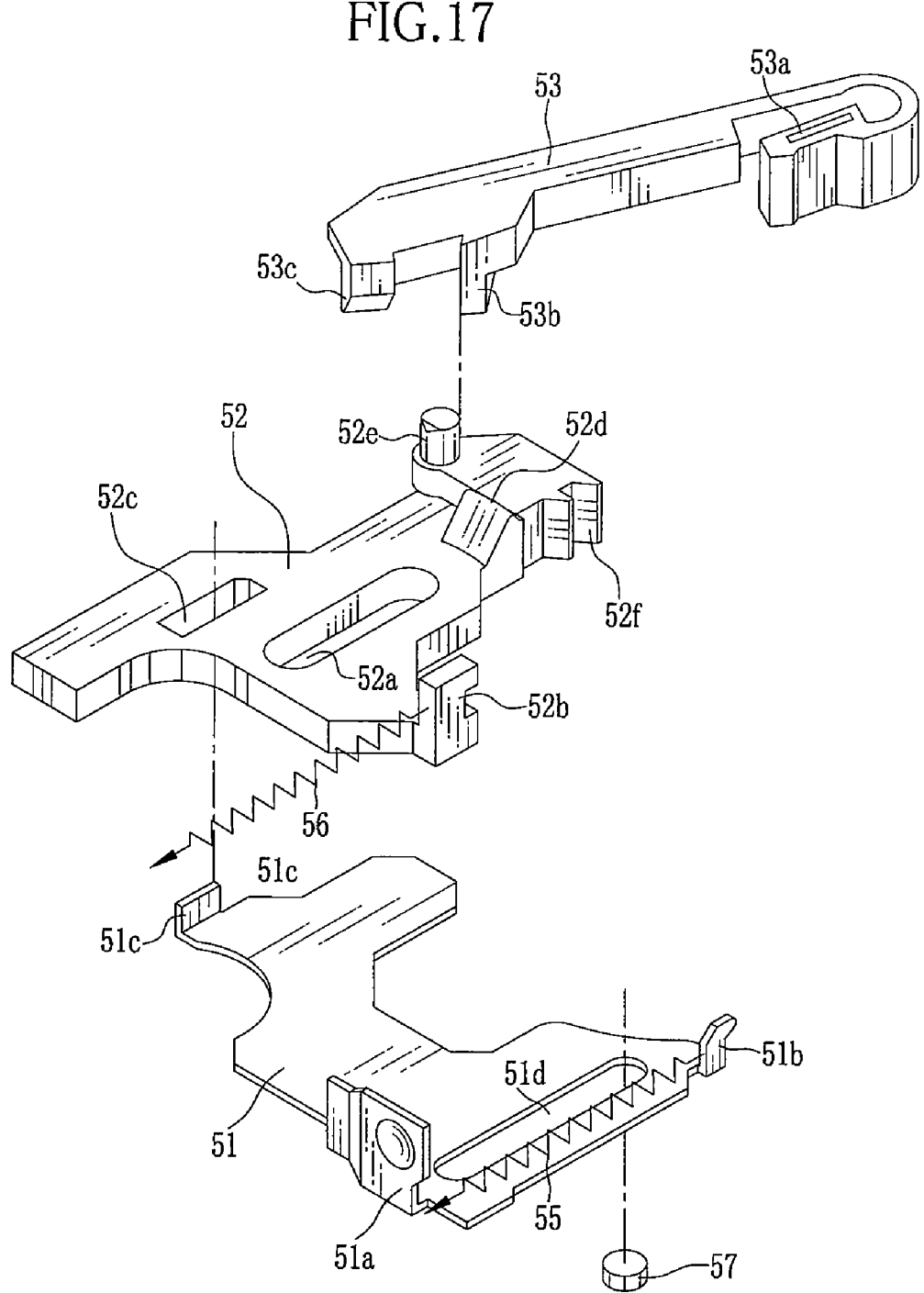
FIG. 17 is an exploded perspective view similar to FIG. 11, but illustrating a second embodiment.

In the second embodiment, a second ejection lever 52 is provided with a rack gear 52f, which is brought into mesh with a large-diameter gear 43b of a third transmission gear 43, as shown in FIG. 17. Pushing force of the operation pin 70 is transmitted to a loading slider 34 via the rack gear 52f and the large-diameter gear 43b, causing the loading slider 34 to move forward.

Figure 18:
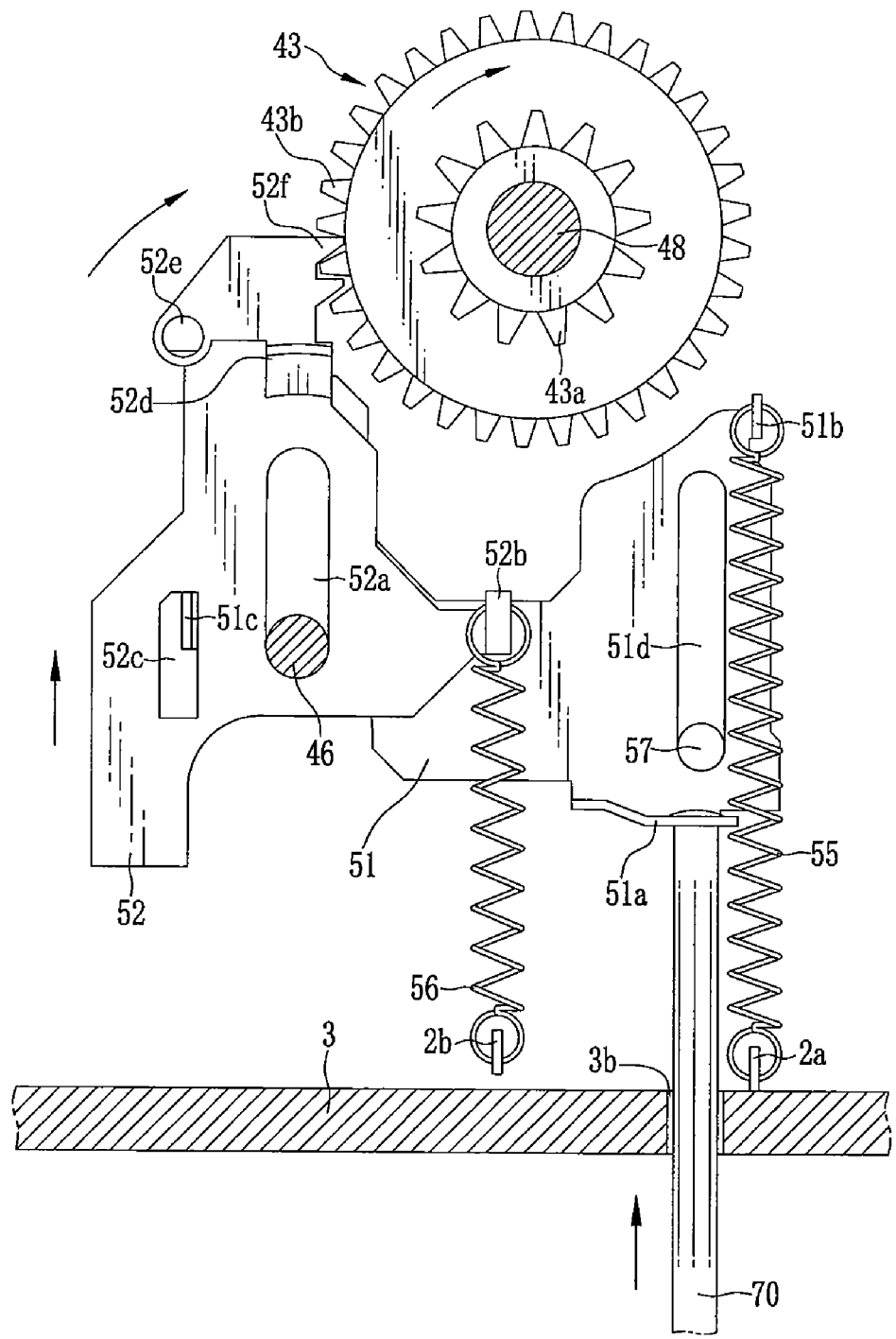
FIG. 18 is a plan illustrating the second embodiment in a condition where a transmission gear mechanism is actuated by a rack gear.
Figure 19:
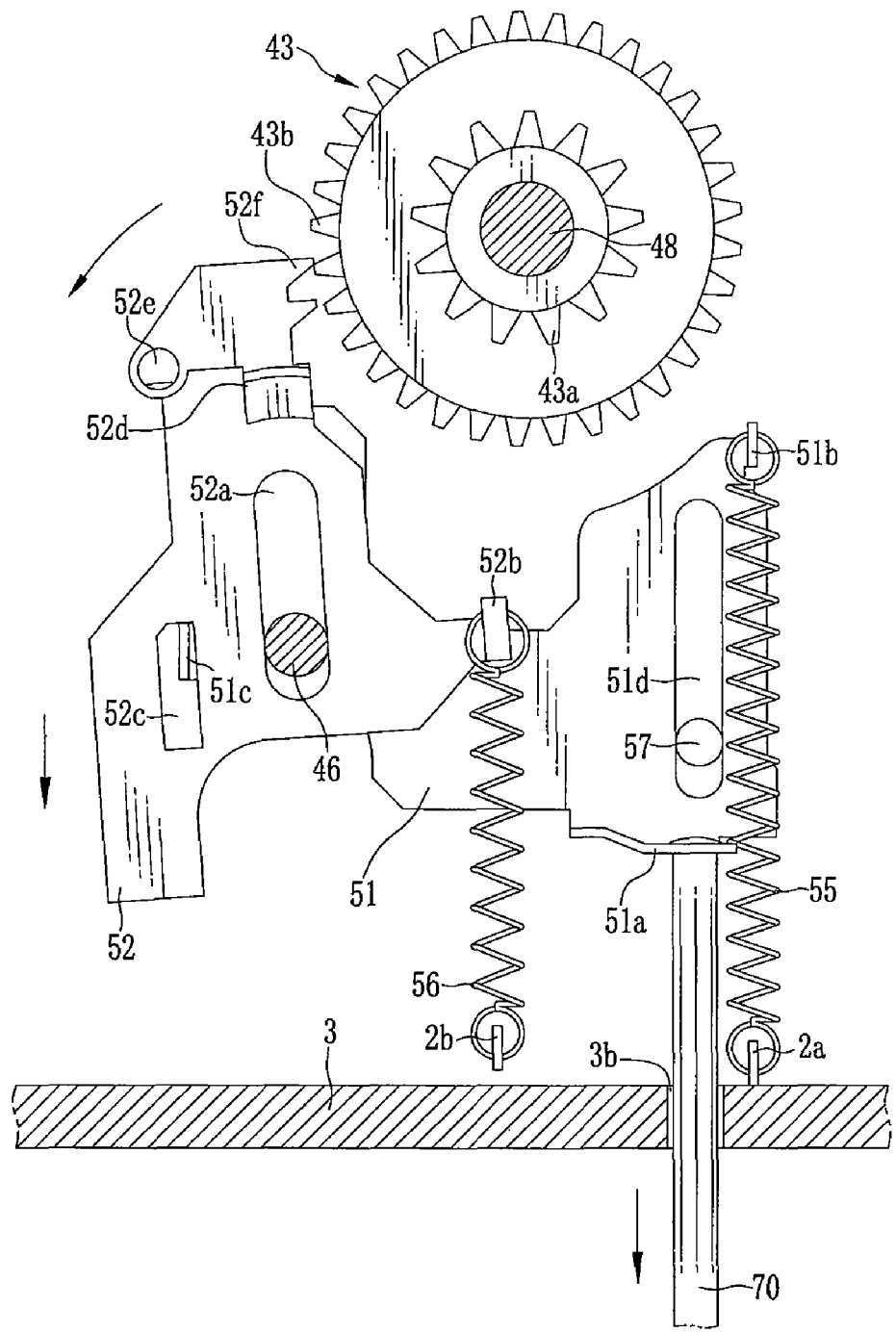
FIG. 19 is a plan illustrating the second embodiment in a condition where the rack gear is retracted from the transmission gear mechanism.

As shown in FIGS. 18 and 19, the coil spring 56 urges a second ejection lever 52 in a direction to swing clockwise and hence keep the rack gear 52*f* in mesh with the large-diameter gear 43*b*. An aperture 52*c* is formed on an opposite side of a pin 46 from the coil spring 56 in a lateral direction orthogonal to a direction of back-and-forth movement of the second ejection lever 52, wherein the second ejection lever 52 is rotatable about the pin 46. According to this configuration, while a pushing lug 51*c* is pushing a rear end of the aperture 52*c* to move the second ejection lever 52 rearward, the clockwise rotation is applied to the second ejection lever 52, so that the rack gear 52*f* is kept engaged with the large-diameter gear 43*b*.

The rack gear 52*f* has ratchet-like teeth having a vertical side and a slant side each. When the second ejection lever 52 moves rearward, the vertical sides of the teeth of the rack gear 52*f* contact against the teeth of the large-diameter gear 43*b*, causing the large-diameter gear 43*b* to turn clockwise. On the contrary, when the second ejection lever 52 moves forward, the slant sides of the teeth of the rack gear 52*f* come to contact with the teeth of the large-diameter gear 43*b*, causing the second ejection lever 52 to rotate slightly counterclockwise against the urging force of the coil spring 56, so that the second ejection lever 52 will slip off the large-diameter gear 43*b* without causing the large-diameter gear 43*b* to turn counterclockwise.

Figure 20:
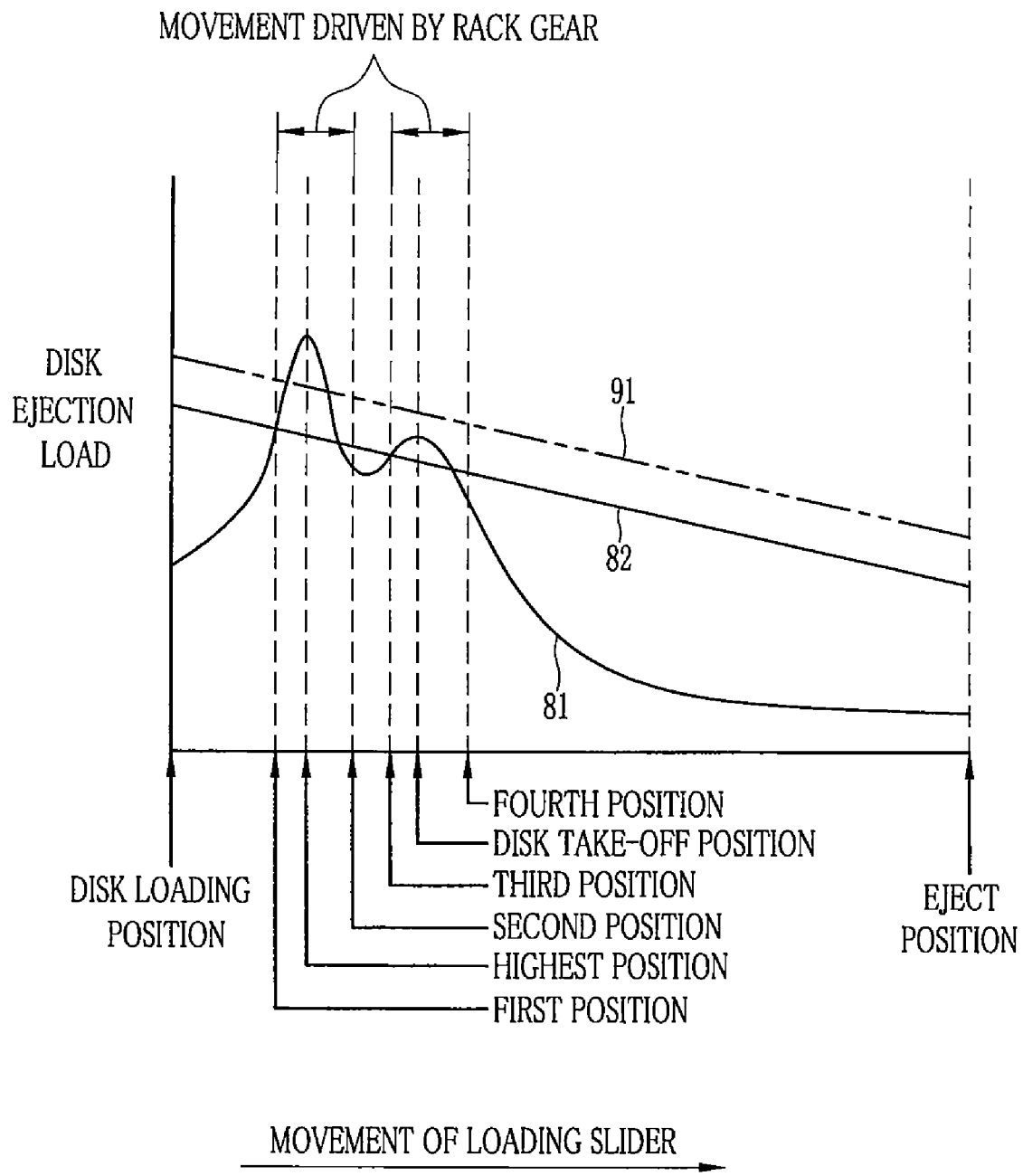
FIG. 20 is a graph illustrating variations in the disk ejection load after the transmission gear mechanism is separated into a disk feeding mechanism side and a motor side.

Referring to FIG. 20, a characteristic curve 81 of the disk ejection load is illustrated in a condition where the transmission gear mechanism 32 is separated into the motor side and the disk feeding mechanism side. The curve 81 represents the disk ejection load of the loading slider 34, whereas the curve 82 represents the driving force (resilient force) of the coil spring 35. While the loading slider 34 is set in the disk loading position, the lifting frame 7 is in the recording/reproducing position as shown in FIG. 7D. As the loading slider 34 moves forward from the disk loading position, the disk support arm 20 and the loading arm 21 swing a little to hold the disk D1. Thereafter the lifting frame 7 moves toward a complete chuck position (the highest position) as shown in FIG. 7C. With the upward movement of the lifting frame 7, the disk ejection load gradually increases. When the lifting frame 7 reaches the complete chuck position, the disk D1 is tightly pressed against the top plate 9, and the disk ejection load is at its maximum.

When the lifting frame 7 begins to move downward from the complete chuck position, the disk ejection load begins to decrease gradually. Immediately after the lifting frame 7 moves past the position shown in FIG. 7B, the chuck release pin 14 holds the disk D1 from its bottom. Thereafter, the disk D1 is stopped from moving downward, whereas the lifting frame 7 alone moves down to the chuck release position (disk take-off position), causing the chuck head 13 to move out of the center hole D1*a* of the disk D1. During this slip-out operation, the disk ejection load gradually increases. After the chuck head 13 is completely removed off the disk D1 the lifting frame 7 further moves down to the lower position as shown in FIG. 7A. The disk ejection load decreases during this interval.

When the lifting frame 7 reaches the lower position, the disk support arm 20 and the loading arm 21 start swinging to eject the disk D1 out of the disk device 1. In this interval, the disk ejection load is small and decreases gently because merely the disk support arm 20 and the loading arm 21 swing.

As seen from FIG. 20, when the disk ejection load is smaller than the driving force of the coil spring 35, the coil spring 35 can drive the loading slider 34 to move forward. However, so long as the disk ejection load is greater than the driving force of the coil spring 35, the loading slider 34 is kept stationary even if it receives the driving force from the coil spring 35. In this interval in which the loading slider 34 is immovable in spite of the driving force from the coil spring 35, the rack gear 52*f* of the second ejection lever 52 serves to drive the third transmission gear 43 to turn in a direction to move the loading slider 34 forward.

In a case where the characteristic curve of the driving force of the coil spring 35 assumes a straight line 82, there are two intervals in which the loading slider 34 stops. Therefore, pushing the operation pin 70 twice into the emergency hole 3*b* can release the disk D1 completely from the chuck, whereby the loading slider 34 may return to the eject position. If just one push of the operation pin 70 is not enough to get over each interval of stoppage of the loading slider 34, it may be necessary to push-and-pull the operation pin 70 more than twice, to turn the third transmission gear 43 step by step.

Moreover, as shown by a line 91, it is possible to raise the driving force of the coil spring 35 so that the loading slider 34 will stop moving just in one interval of the disk ejecting operation. Thereby, just one push of the operation pin 70 may release the chuck of the disk D1 completely, and enable the loading slider 34 to return to the eject position. It is to be noted that the first embodiment assumes that the driving force of the coil spring 35 is greater than the disk ejection load 81.

Figure 21:
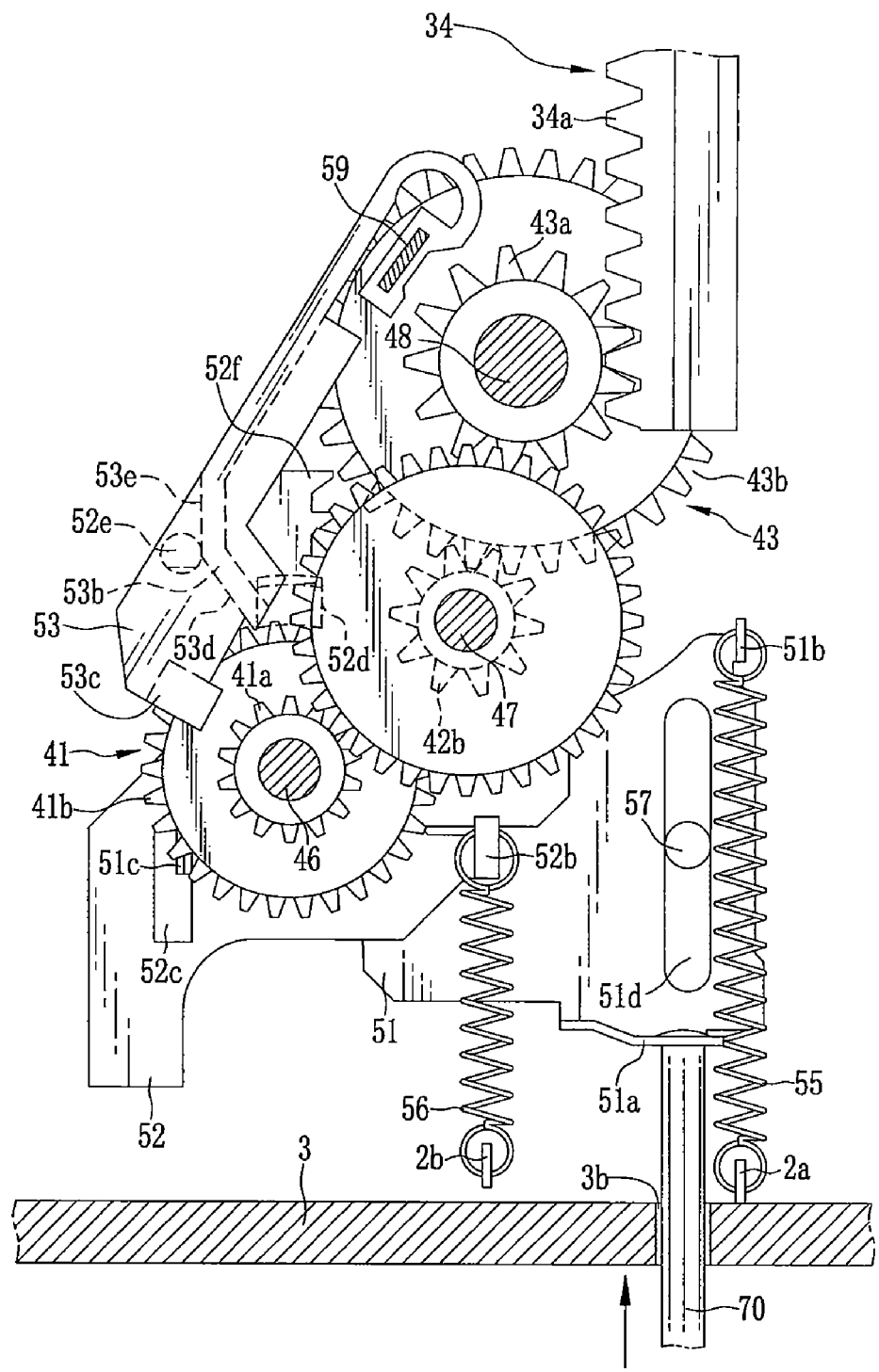
FIG. 21 is a plan illustrating the second embodiment in a condition where a first transmission gear is moved to a disengaged position by pushing an operation pin into an emergency hole.
Figure 22:
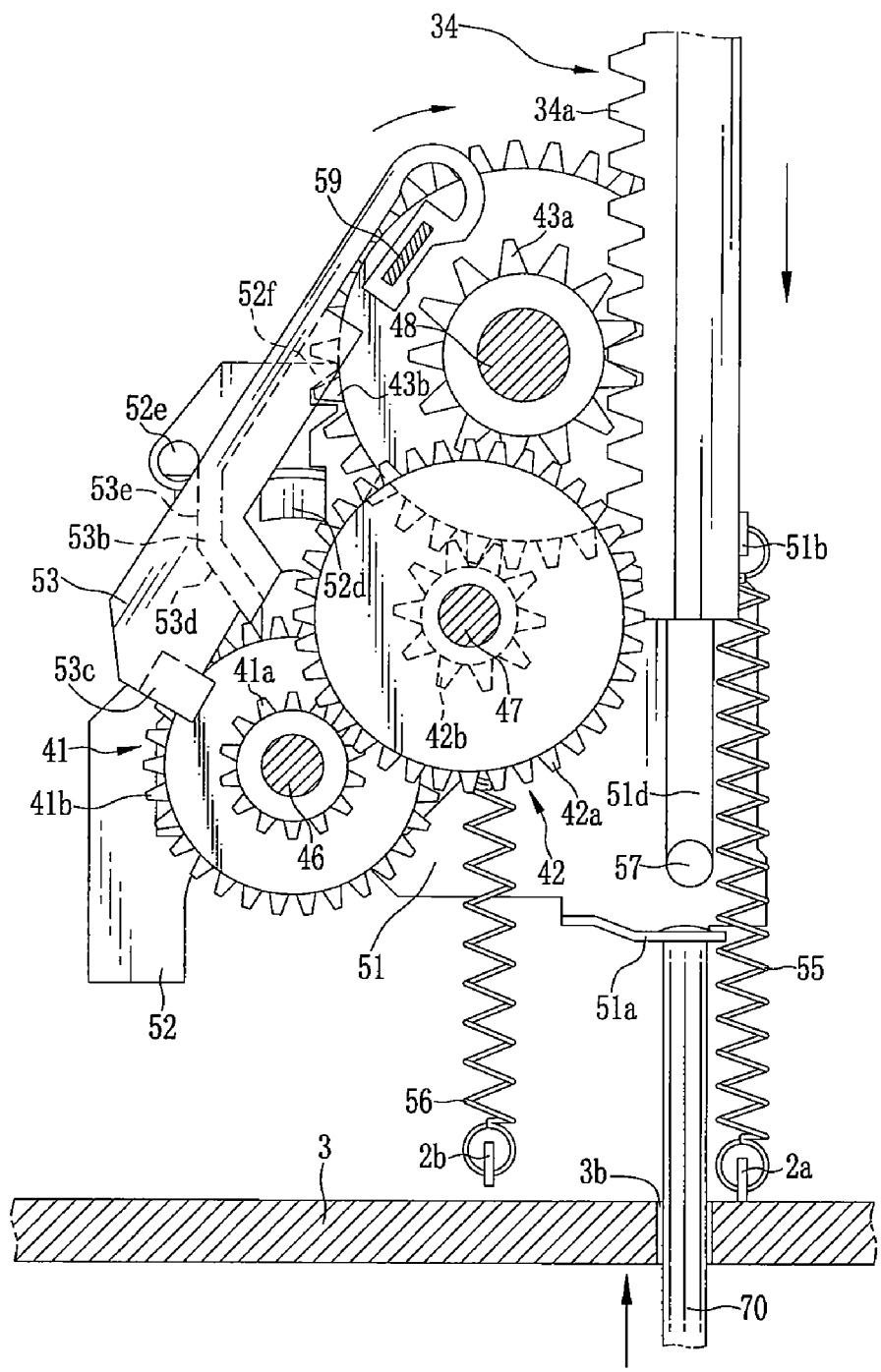
FIG. 22 is a plan illustrating the second embodiment in a condition where the rack gear is in mesh with the third transmission gear.
Figure 23:
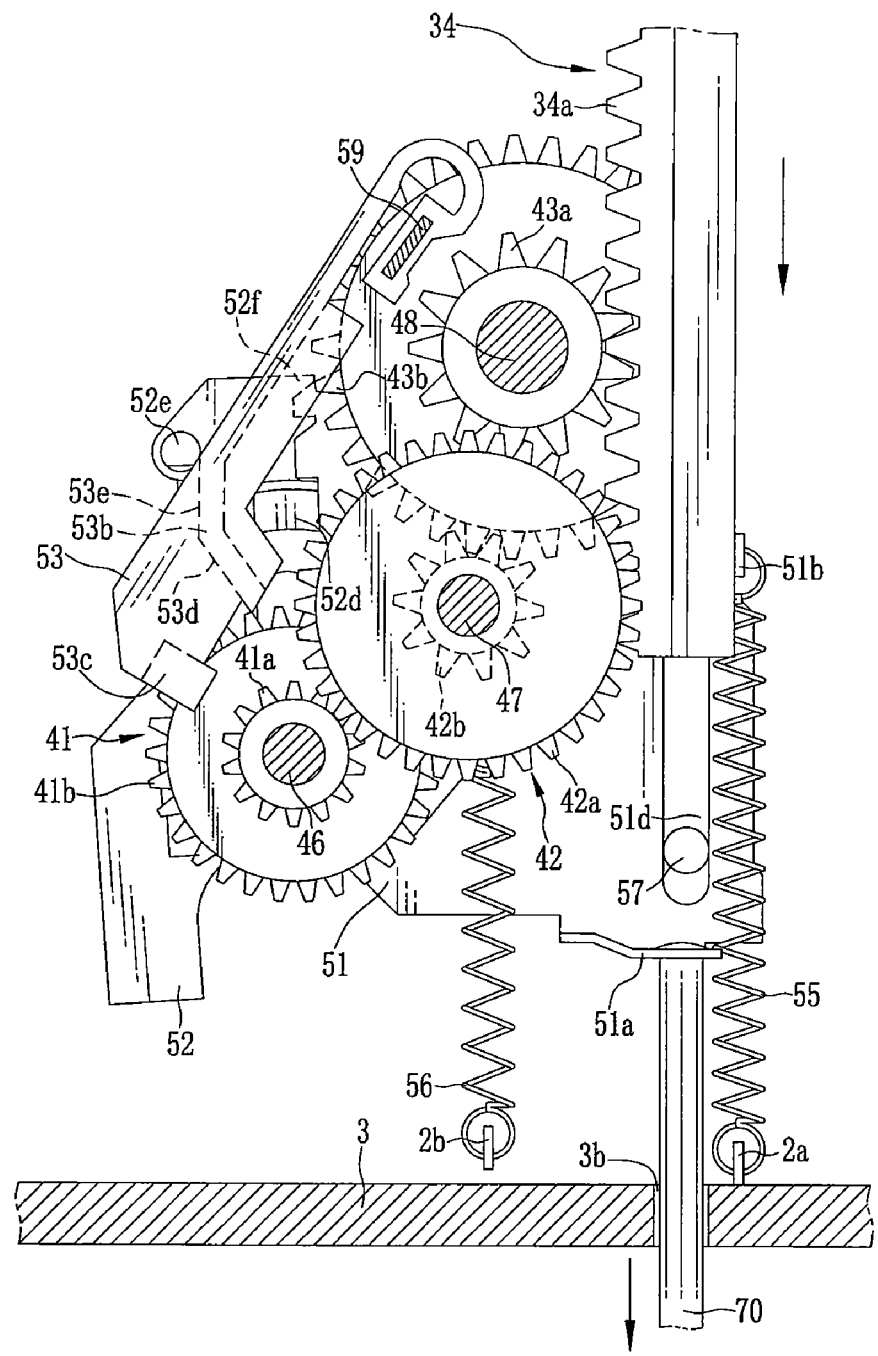
FIG. 23 is a plan illustrating the second embodiment in a condition where the operation pin starts being pulled out.

Now the forcible disk ejection according to the second embodiment will be described with reference to FIGS. 21 to 25, providing that the driving force of the coil spring 35 is represented by the line 82 in FIG. 20. As shown in FIG. 21, pushing the operation pin 70 into the emergency hole 3*b* first causes the first ejection lever 51 to move rearward, like the above first embodiment. After the first ejection lever 51 moves a predetermined distance rearward, the second ejection lever 52 begins to move together with the first ejection lever 51.

The rearward movement of the first and second ejection levers 51 and 52 pushes the first transmission gear 41 downward to disengage it from the second transmission gear 42. Thereby, the transmission gear mechanism 43 is separated in to the motor side and the disk feeding mechanism side. When the transmission gear mechanism 32 is separated into the motor side and the disk feeding mechanism side, the third transmission gear 43 is enabled to turn free from the large rotational load of the worm gear 31*a*. Therefore, the resilient force of the coil spring 35 causes the loading slider 34 to move forward, turning the third transmission gear 43 in a direction to start ejecting the disk D1.

As the loading slider 34 moves forward from the disk loading position, the disk ejection load gradually increases, as shown by the curve 81 in FIG. 20, and reaches the same level as the driving force of the coil spring 35, as shown by the line 82. At this moment, the loading slider 34 loses the driving force necessary for its forward movement, and stops at a first position.

When the operation pin 70 is further pushed to move the ejection levers 51 and 52 about 2 mm farther in the rearward direction, as shown in FIG. 21, the rack gear 52*f* is brought into engagement with the large-diameter gear 43*b*. Thereafter when the ejection levers 51 and 52 are moved farther 2 mm or so in the rearward direction, the third transmission gear 43 turns clockwise because of the engagement with the rack gear 52*f*.

With the clockwise turn of the third transmission gear 43, the loading slider 34 moves past the highest position to a second position (see FIG. 20). At this moment, the driving force of the coil spring 35 is greater than the disk ejection load, so that the loading slider 34 is driven to moves forward.

However, since the aperture 52c is stopped against the pushing lug 51c, as shown in FIG. 18, the second ejection lever 52 cannot swing counterclockwise. As a result, the rack gear 52f is kept engaged with the large-diameter gear 43b, locking the third transmission gear 43 from turning. Thus, the loading slider 34 stops moving forward.

When the operator starts pulling out the operation pin 70 while the loading slider 34 stops at the second position, the ejection levers 51 and 52 return to their front positions according to the forces of the coil springs 55 and 56. Then, the teeth of the large-diameter gear 43b contact against the slant sides of the teeth of the rack gear 52f, and the pushing lug 51c moves forward inside the aperture 52c. As a result, as shown in FIG. 19, the rack gear 52f moves past the large-diameter gear 43b, while rotating the second ejection lever 52 slightly counterclockwise about the pin 46 against the force of the coil spring 56. When the rack gear 52f comes to be disengaged from the large-diameter gear 43b, the large-diameter gear 43b can rotate freely. At this moment, the driving force of the coil spring 35 is greater than the disk ejection load, and hence causes the loading slider 34 to move forward, as show in FIG. 23. However, when the loading slider 34 comes to a third position where the disk ejection load goes above the driving force of the coil spring 35, the loading slider 34 stops again.

Figure 24:
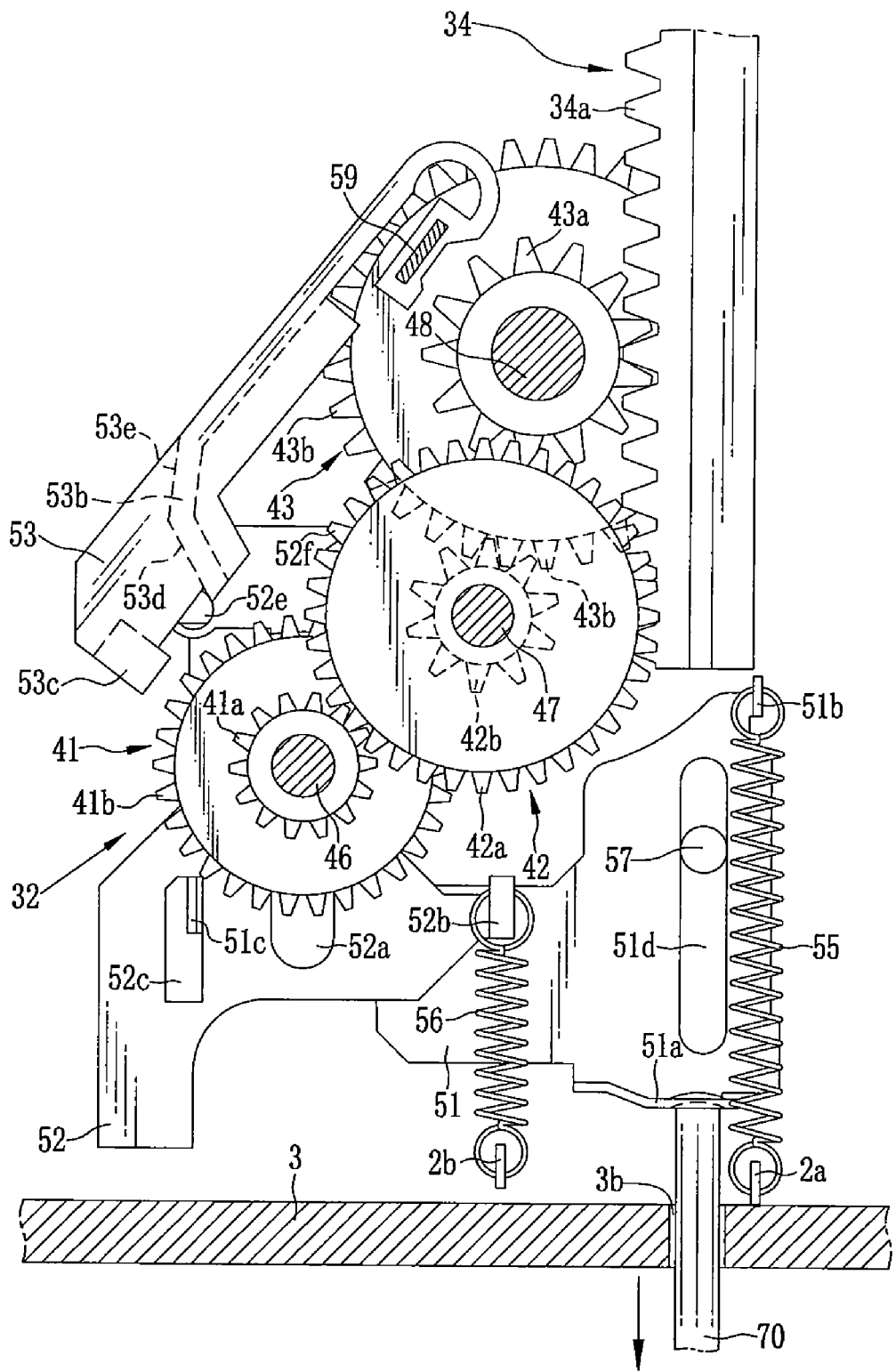
FIG. 24 is a plan illustrating the second embodiment in a condition where the loading slider stops because of an increase in disk ejection load during the pull-out movement of the operation pin.

As the operation pin 70 is further drawn back from the emergency hole 3b, as shown in FIG. 24, the second ejection lever 52 further moves forward. As a result, the disengaging lever 53 is released from the pressure of the boss 52e, thereby returning to its initial position. When the disengaging lever 53 returns to the initial position, the push-down protrusion 53c is displaced from the top side of the first transmission gear 41, enabling the first transmission gear 41 to move upward. Thereafter, as shown in FIG. 12, the clutch projection 52d comes to contact with the bottom of the first transmission gear 41, pushing the first transmission gear 41 up to the engaged position where the first transmission gear 41 is engaged with the second transmission gear 42.

Thereafter, the operation pin 70 is pushed again to move the ejection levers 51 and 52 rearward. Thereby, the first transmission gear 41 is disengaged from the second transmission gear 42, and then the rack gear 52f is engaged with the large-diameter gear 43b. As a result, the rack gear 52f causes the third transmission gear 43 to turn in the direction to make the loading slider 34 move over the disk take-off position to a fourth position, releasing the disk D1 from the chuck head 13. Thereafter, the disk ejection load gets lower than the driving force of the coil spring 35, so that the loading slider 34 may move forward according to the force of the coil spring 35.

Since the operation pin 70, which is pushed again after being pulled a little outward, causes the rack gear 52f to engage with the large-diameter gear 43b again while the first transmission gear 41 is kept disengaged from the second transmission gear 42, the third transmission gear 43 is enabled to turn again.

When the operator starts pulling the operation pin 70 while the loading slider 34 stops at the fourth position, the ejection levers 51 and 52 is moved forward according to the force of the coil springs 55 and 56, disengaging the rack gear 52f from the large-diameter gear 43b. When the rack gear 52f is disengaged from the large-diameter gear 43b, the loading slider 34 starts moving forward according to the force of the coil spring 35. Since the disk ejection load is reduced, the loading slider 34 moves faster forward, to feed the disk D1 toward the eject position.

As a result of forward movement of the second ejection lever 52 following the pull-out movement of the operation pin 70, the first transmission gear 41 comes to mesh with the second transmission gear 42. Through the engagement between the first transmission gear 41 and the second transmission gear 42, the large load of the worm gear 31a is applied to the loading slider 34, stopping the forward movement of the loading slider 34. When the loading slider 34 stops this way, the disk support arm 20 and the loading arm 21 have fed the disk D1 out to the forcible eject position as shown by dashed-two dotted lines in FIG. 2.

Figure 25:
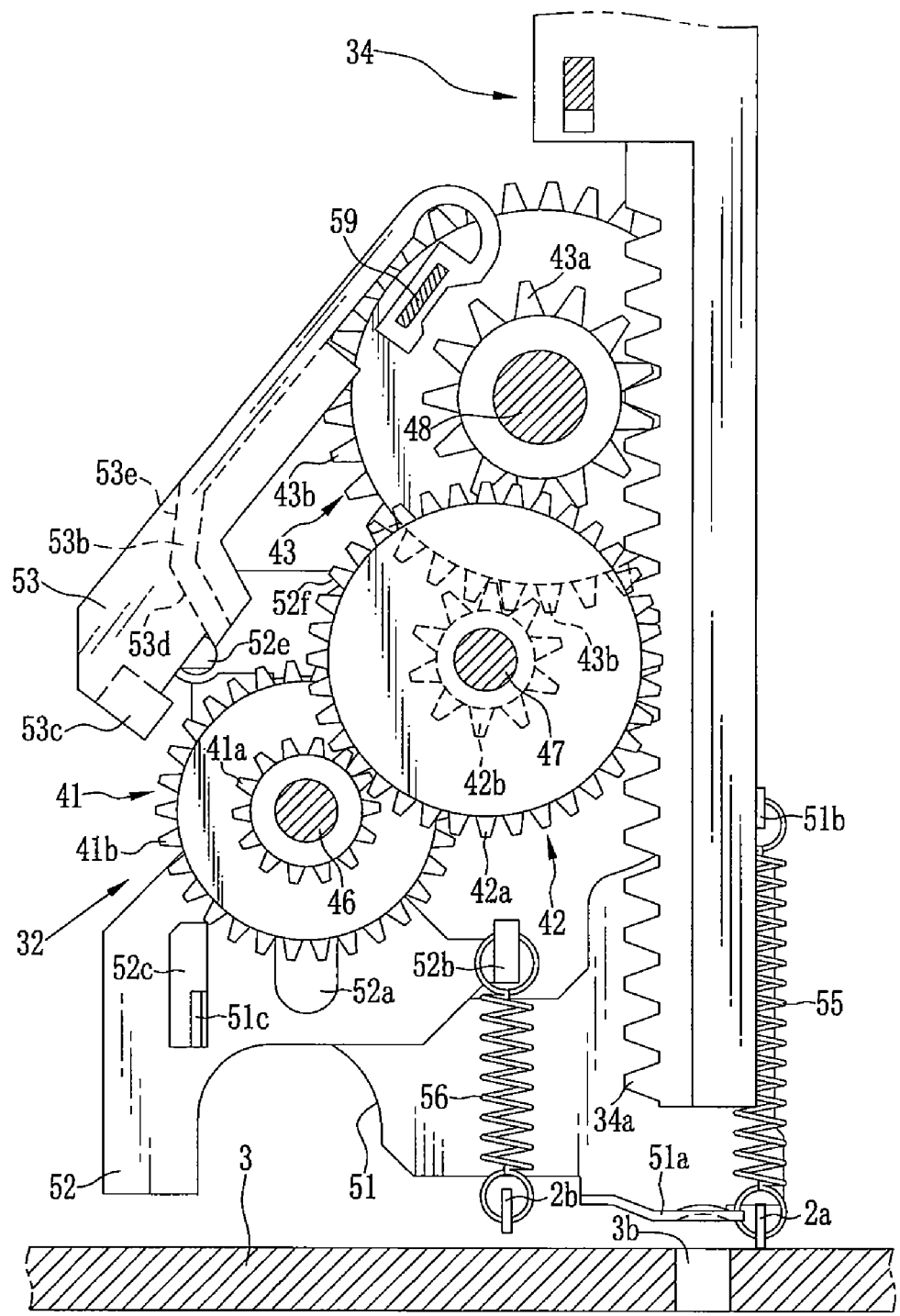
FIG. 25 is a plan illustrating the second embodiment in a condition where the loading slider moves to an eject position.

The second ejection lever 52 stops the forward movement after the first transmission gear 41 completely engages with the second transmission gear 42. Thereafter, the first ejection lever 51 alone further moves forward. Accordingly, as shown in FIG. 25, the front end of the loading slider 34 is a little set back from the receiving lug 51a of the first ejection lever 51 in the forcible ejection of the disk D1.

If the operation pin 70 is pulled out too fast, the first and second ejection levers 51 and 52 may return so quickly that the first transmission gear 41 gets engaged with the second transmission gear 42 in a moment when the loading slider 34 has moved a little forward from the fourth position. In that case, the loading slider 34 will stop at a position where the disk D1 is entirely inside the slot 3a or exposed a little to the outside. To feed the disk D1 sufficiently out of the slot 3a, the operator may have to push the operation pin 70 again into the hole 3b, thereby to release the engagement between the first transmission gear 41 and the second transmission gear 42. Then, the driving force of the coil spring 35 will cause the loading slider 34 to move forward to feed the disk D1 out of the slot 3a.

To prevent the loading slider 34 from stopping on the way to eject the disk D1 even if the operation pin 70 is pulled out quickly, the returning speed of the second ejection lever 52 may be slowed down as compared to the forward movement of the loading slider 34. The returning speed of the second ejection lever 52 can be slowed down by reducing resiliency of the coil springs 55 and 56, by applying grease between the first ejection lever 51 and the second ejection lever 52 so as to raise the friction of the second ejection lever 52, or by coupling a reduction mechanism to the second ejection lever 52.

On the other hand, as the operation pin 70 is drawn back slowly while the loading slider 34 stops at the fourth position, the front end of the loading slider 34 will be stopped against the receiving lug 51a of the first ejection lever 51 before the loading slider 34 moves sufficiently forward. As a result, the forward movement of the loading slider 34 will be interrupted, and the disk D1 will stop in the position as shown by solid lines in FIG. 2, protruding about 20 mm out of the bezel 3. In that case, however, the loading slider 34 will start moving forward along with the draw-back operation of the operation pin 70, in the same way as in the first embodiment, feeding the disk D1 out to the forcible eject position as shown by dashed-two dotted lines in FIG. 2.

Although the receiving lug 51a of the first ejection lever 51 is designed to receive both the loading slider 34 and the operation pin 70 in the above embodiments, it is possible to provide separate receiving members respectively for the loading slider 34 and the operation pin 70.

In the above embodiment, the forward movement of the ejection levers 51 and 52 leads to disengaging the first transmission gear 41 from the second transmission gear 42. However, it is alternatively possible to release the engagement between the second transmission gear 42 and the third transmission gear 43 by the forward movement of the ejection levers 51 and 52.

Moreover, in place of the disengaging lever 53, a spring may be provided to urge the first transmission gear 41 toward the disengaged position. Furthermore, the same member as the pushing lug 51c may be formed on the second ejection lever 52, while a corresponding aperture to the aperture 52c may be formed in the first ejection lever 51.

It should be understood that various changes and modifications of the present invention will be possible to those skilled in the art without departing from the scope of the present invention as specified in appended claims. Therefore, these changes and modifications should be construed as included in the scope of the present invention.

What is claimed is:

1. A disk device having a case chassis with a slot, through which a disk is loaded into said case chassis, said disk device comprising:
    a disk feeding mechanism having a loading slider that is movable back and forth, wherein said disk feeding mechanism feeds said disk into said case chassis as said loading slider moves rearward, and said disk feeding mechanism feeds said disk out of said case chassis as said loading slider moves forward;
    a first spring giving a driving force to said loading slider to move said loading slider forward;
    a motor rotatable in opposite directions;
    a transmission gear mechanism for transmitting rotation of said motor to said loading slider to move said loading slider forward or rearward, said transmission gear mechanism having at least first and second gears;
    an ejection device for forcible ejection of said disk, said ejection device being moved rearward by inserting and pushing an operation member from the front into said case chassis;
    a second spring for biasing said ejection device forward; and
    a clutch provided in said ejection device, wherein said clutch causes said first gear to move from a position engaged with said second gear to a disengaged position while said ejection device is moving rearward, said clutch causes said first gear to return to said engaged position while said ejection device is returning to a front position, and said first gear is disengaged from said second gear in said disengaged position, separating said transmission gear mechanism into a disk feeding mechanism side coupled to said disk feeding mechanism and a motor side coupled to said motor; and
    wherein said disk is fed out of said case chassis as said loading slider moves forward along with pull-out movement of said operation member.

2. A disk device as defined in claim 1, further comprising a stop member provided in said ejection device, said stop member receiving said loading slider when said loading slider moves to a front position according to the force of said first spring after said first gear moves to said disengaged position, said stop member permitting said loading slider to move forward along with said ejection device till said first gear returns to said engaged position while said ejection device is returning to the front position.

3. A disk device as defined in claim 2, wherein said ejection device comprises:
    a first ejection lever to be pushed by said operation member; and
    a second ejection lever pushed by said first ejection lever to move together with said first ejection lever after said first ejection lever moves a predetermined idling distance.

4. A disk device as defined in claim 3, wherein said stop member is a receiving portion elevated perpendicularly from said first ejection lever, and said receiving portion is pushed at its front side by said operation member, and receives at its rear side said loading slider.

5. A disk device as defined in claim 3, wherein said loading slider moves forwards to a position where a front end of said loading slider is substantially in contact with said stop member when said loading slider is driven by said motor via said transmission gear mechanism to unload said disk automatically.

6. A disk device as defined in claim 1, further comprising:
    a rack gear engageable with a third gear that belongs to said disk feeding mechanism side of said transmission gear mechanism, said rack gear causing said third gear to turn as said ejection device further moves a predetermined distance after said first gear moves to said disengaged position, thereby to force said loading slider to move forward even while the load for ejecting said disk is greater than the driving force of said first spring; and
    a rack gear engagement control device for controlling engagement between said rack gear and said third gear, wherein said rack gear engagement control device keeps said rack gear in engagement with said third gear while said ejection device is moving rearward in response to the push of said operation member, and said rack gear engagement control device permits said rack gear to return and slip off said third gear while said ejection device is moving forward along with the pull-out movement of said operation member.

7. A disk device as defined in claim 6, wherein the driving force of said first spring causes said loading slider to move forward after said rack gear returns to disengage from said third gear and while the disk ejection load is smaller than the driving force of said first spring; and
    said loading slider stops moving when said first gear moves into said engaged position and makes the disk ejection load greater than the driving force of said first spring.

8. A disk device as defined in claim 7, wherein said ejection device comprises:
    a first ejection lever to be pushed by said operation member; and
    a second ejection lever having said rack gear, said second ejection lever being able to swing to permit said rack gear to slip off said third gear, and being pushed by said first ejection lever to move together after said first ejection lever moves a predetermined idling distance.

9. A disk device as defined in claim 8, wherein said rack gear engagement control device comprises:
    a third spring biasing said second ejection lever forward, said third spring giving a rotational force to said second ejection lever so as to bring said rack gear into engagement with said third gear;
    a lug provided on one of said first and second ejection levers; and
    an aperture for accepting said lug, said aperture being provided on the other of said first and second ejection levers, and wider than said lug to permit said second ejection lever to swing about a pivotal center, wherein
    said aperture and said lug are located on an opposite side of said pivotal center of said second ejection lever from said third spring such that said second ejection lever begins to move rearward together with said first ejection lever when said lug comes to contact against an end of said aperture after said first ejection lever moves the predetermined idling distance.

10. A disk device as defined in claim 8, wherein said clutch device is a projection provided on said second ejection lever, said projection moving into under said first gear to set said first gear in said engaged position, and getting out from under said first gear to cause said first gear to move from said engaged position to said disengaged position.

11. A disk device as defined in claim 8, further comprising a receiving portion formed in said first ejection lever, wherein said receiving portion may be pushed at its front side by said operation member, and may receive at its rear side the front end of said loading slider.

12. A disk device as defined in claim 11, wherein said loading slider moves forward to a position where the front end thereof is close to said receiving portion when said loading slider is driven by said motor via said transmission gear mechanism to unload said disk automatically.

13. A disk device having a case chassis with a slot, through which a disk is loaded into said case chassis, said disk device comprising:
   a disk feeding mechanism having a loading slider that is movable back and forth, wherein said disk feeding mechanism feeds said disk into said case chassis as said loading slider moves rearward, and said disk feeding mechanism feeds said disk out of said case chassis as said loading slider moves forward;
   a first spring giving a driving force to said loading slider to move said loading slider forward;
   a motor rotatable in opposite directions;
   a transmission gear mechanism for transmitting rotation of said motor to said loading slider to move said loading slider forward or rearward, said transmission gear mechanism having at least first and second gears;
   an ejection device for forcible ejection of said disk, said ejection device being moved rearward by inserting and pushing an operation member from the front into said case chassis;
   a second spring for biasing said ejection device forward;
   a clutch provided in said ejection device, wherein said clutch causes said first gear to move from a position engaged with said second gear to a disengaged position while said ejection device is moving rearward, said clutch causes said first gear to return to said engaged position while said ejection device is returning to a front position, and said first gear is disengaged from said second gear in said disengaged position, separating said transmission gear mechanism into a disk feeding mechanism side coupled to said disk feeding mechanism and a motor side coupled to said motor; and
   a stop member provided in said ejection device, said stop member receiving said loading slider when said loading slider moves to a front position according to the force of said first spring after said first gear moves to said disengaged position, and said stop member permitting said loading slider to move forward along with said ejection device till said first gear returns to said engaged position while said ejection device is returning to the front position.

14. A disk device having a case chassis with a slot, through which a disk is loaded into said case chassis, said disk device comprising:
   a disk feeding mechanism having a loading slider that is movable back and forth, wherein said disk feeding mechanism feeds said disk into said case chassis as said loading slider moves rearward, and said disk feeding mechanism feeds said disk out of said case chassis as said loading slider moves forward;
   a first spring giving a driving force to said loading slider to move said loading slider forward;
   a motor rotatable in opposite directions;
   a transmission gear mechanism for transmitting rotation of said motor to said loading slider to move said loading slider forward or rearward, said transmission gear mechanism including at least first to third gears, said first gear belonging to a motor side and said second and third gears belonging to a disk feeding mechanism side;
   an ejection device for forcible ejection of said disk, said ejection device being moved rearward by inserting and pushing an operation member from the front into said case chassis;
   a second spring for biasing said ejection device forward;
   a clutch provided in said ejection device, wherein said clutch causes said first gear to move from a position engaged with said second gear to a disengaged position while said ejection device is moving rearward, said clutch causes said first gear to return to said engaged position while said ejection device is returning to a front position, and said first gear is disengaged from said second gear in said disengaged position, separating said transmission gear mechanism into said disk feeding mechanism side and said motor side; and
   a rack gear engageable with said third gear, said rack gear causing said third gear to turn as said ejection device further moves a predetermined distance after said first gear moves to said disengaged position, thereby to force said loading slider to move forward even while the load for ejecting said disk is greater than the driving force of said first spring; and
   a rack gear engagement control device for controlling engagement between said rack gear and said third gear, wherein said rack gear engagement control device keeps said rack gear in engagement with said third gear while said ejection device is moving rearward in response to the push of said operation member, and said rack gear engagement control device permits said rack gear to return and slip off said third gear while said ejection device is moving forward along with the pull-out movement of said operation member.

* * * * *